United States Patent
Worsham

(10) Patent No.: US 12,521,345 B1
(45) Date of Patent: Jan. 13, 2026

(54) LARGE-SCALE MANUFACTURING METHODS FOR AMINOGLYCOSIDES

(71) Applicant: Insmed Incorporated, Bridgewater, NJ (US)

(72) Inventor: Robert Worsham, Bridgewater, NJ (US)

(73) Assignee: Insmed Incorporated, Bridgewater, NJ (US)

( * ) Notice: Subject to any disclaimer, the term of this patent is extended or adjusted under 35 U.S.C. 154(b) by 0 days.

(21) Appl. No.: 18/825,766

(22) Filed: Sep. 5, 2024

Related U.S. Application Data

(63) Continuation of application No. 17/052,070, filed as application No. PCT/US2019/030404 on May 2, 2019, now abandoned.

(60) Provisional application No. 62/665,564, filed on May 2, 2018.

(51) Int. Cl.
*A61K 9/1277* (2025.01)
*A61K 31/7036* (2006.01)

(52) U.S. Cl.
CPC ........ *A61K 9/1277* (2013.01); *A61K 31/7036* (2013.01)

(58) Field of Classification Search
CPC .................................................. A61K 9/1277
See application file for complete search history.

(56) References Cited

U.S. PATENT DOCUMENTS

| | | | |
|---|---|---|---|
| 3,091,572 A | 5/1963 | Luedemann et al. | |
| 3,136,704 A | 6/1964 | William et al. | |
| 4,235,871 A | 11/1980 | Papahadjopoulos et al. | |
| 4,372,949 A | 2/1983 | Kodama et al. | |
| 4,394,448 A | 7/1983 | Szoka, Jr. et al. | |
| 4,396,630 A | 8/1983 | Riedl et al. | |
| 4,451,447 A | 5/1984 | Kaplan et al. | |
| 4,515,736 A | 5/1985 | Deamer | |
| 4,522,803 A | 6/1985 | Lenk et al. | |
| 4,547,490 A | 10/1985 | Ecanow et al. | |
| 4,588,578 A | 5/1986 | Fountain et al. | |
| 4,606,939 A | 8/1986 | Frank et al. | |

(Continued)

FOREIGN PATENT DOCUMENTS

| CA | 2174803 A1 | 10/1997 |
|---|---|---|
| CA | 2101241 C | 12/1998 |

(Continued)

OTHER PUBLICATIONS

JH Zhang and JB Zhu. "A Novel Method to Prepare Liposomes Containing Amikacin." Journal of Microencapsulation, vol. 16, No. 4, 1999, pp. 511-516. (Year: 1999).*

(Continued)

*Primary Examiner* — Isaac Shomer

(74) *Attorney, Agent, or Firm* — Joshua Marcus; Dong Chen

(57) ABSTRACT

Provided herein are large-scale manufacturing methods for drug formulations containing an aminoglycoside such as amikacin. The method utilizes mixing a first stream comprising DPPC and cholesterol with a second stream comprising amikacin sulfate at particular flow rates to obtain a drug formulation with a superior encapsulation efficiency. The processes described herein address the need for preparing aminoglycoside drug formulations at commercial scale.

17 Claims, 2 Drawing Sheets

(56) References Cited

U.S. PATENT DOCUMENTS

| | | |
|---|---|---|
| 4,684,625 A | 8/1987 | Eppstein et al. |
| 4,693,999 A | 9/1987 | Axelsson et al. |
| 4,721,612 A | 1/1988 | Janoff et al. |
| 4,767,874 A | 8/1988 | Shima et al. |
| 4,833,134 A | 5/1989 | Kishimoto et al. |
| 4,857,311 A | 8/1989 | Domb et al. |
| 4,895,452 A | 1/1990 | Yiournas et al. |
| 4,895,719 A | 1/1990 | Radhakrishnan et al. |
| 4,897,384 A | 1/1990 | Janoff et al. |
| 4,933,121 A | 6/1990 | Law et al. |
| 4,952,405 A | 8/1990 | Yau-Young |
| 4,963,367 A | 10/1990 | Ecanow |
| 4,975,282 A | 12/1990 | Cullis et al. |
| 4,981,692 A | 1/1991 | Popescu et al. |
| 5,000,958 A | 3/1991 | Fountain et al. |
| 5,006,343 A | 4/1991 | Benson et al. |
| 5,008,050 A | 4/1991 | Cullis et al. |
| 5,023,087 A | 6/1991 | Yau-Young |
| 5,030,453 A | 7/1991 | Lenk et al. |
| 5,041,278 A | 8/1991 | Janoff et al. |
| 5,049,388 A | 9/1991 | Knight et al. |
| 5,049,389 A | 9/1991 | Radhakrishnan |
| 5,059,421 A | 10/1991 | Loughrey et al. |
| 5,059,591 A | 10/1991 | Janoff et al. |
| 5,077,056 A | 12/1991 | Bally et al. |
| 5,169,637 A | 12/1992 | Lenk et al. |
| 5,178,876 A | 1/1993 | Khokhar et al. |
| 5,192,549 A | 3/1993 | Barenolz et al. |
| 5,211,955 A | 5/1993 | Legros et al. |
| 5,252,339 A | 10/1993 | Cristofori et al. |
| 5,264,618 A | 11/1993 | Felgner et al. |
| 5,269,979 A | 12/1993 | Fountain |
| 5,279,833 A | 1/1994 | Rose |
| 5,316,771 A | 5/1994 | Barenholz et al. |
| 5,320,906 A | 6/1994 | Eley et al. |
| 5,334,761 A | 8/1994 | Gebeyehu et al. |
| 5,401,511 A | 3/1995 | Margalit |
| 5,409,704 A | 4/1995 | Bally et al. |
| 5,415,867 A | 5/1995 | Minchey et al. |
| 5,459,127 A | 10/1995 | Felgner et al. |
| 5,508,269 A | 4/1996 | Smith et al. |
| 5,540,936 A | 7/1996 | Coe et al. |
| 5,543,152 A | 8/1996 | Webb et al. |
| 5,549,102 A | 8/1996 | Lintl et al. |
| 5,569,464 A | 10/1996 | Endo et al. |
| 5,578,320 A | 11/1996 | Janoff et al. |
| 5,580,575 A | 12/1996 | Unger et al. |
| 5,596,982 A | 1/1997 | Blaha-Schnabel |
| 5,610,198 A | 3/1997 | Barry, III et al. |
| 5,614,216 A | 3/1997 | Janoff |
| 5,616,334 A | 4/1997 | Janoff et al. |
| 5,616,341 A | 4/1997 | Mayer et al. |
| 5,631,018 A | 5/1997 | Zalipsky et al. |
| 5,641,662 A | 6/1997 | Debs et al. |
| 5,643,599 A | 7/1997 | Lee et al. |
| 5,662,929 A | 9/1997 | Lagace et al. |
| 5,665,383 A | 9/1997 | Grinstaff et al. |
| 5,723,147 A | 3/1998 | Kim et al. |
| 5,736,155 A | 4/1998 | Bally et al. |
| 5,740,966 A | 4/1998 | Blaha-Schnabel |
| 5,741,516 A | 4/1998 | Webb et al. |
| 5,753,613 A | 5/1998 | Ansell et al. |
| 5,756,120 A | 5/1998 | Hersch et al. |
| 5,756,121 A | 5/1998 | Bracken |
| 5,756,353 A | 5/1998 | Debs |
| 5,759,571 A | 6/1998 | Hersch et al. |
| 5,766,627 A | 6/1998 | Sankaram et al. |
| 5,785,987 A | 7/1998 | Hope et al. |
| 5,795,589 A | 8/1998 | Mayer et al. |
| 5,814,335 A | 9/1998 | Webb et al. |
| 5,820,848 A | 10/1998 | Boni et al. |
| 5,823,178 A | 10/1998 | Lloyd et al. |
| 5,837,279 A | 11/1998 | Janoff et al. |
| 5,837,282 A | 11/1998 | Fenske et al. |
| 5,840,702 A | 11/1998 | Bedwell |
| 5,843,473 A | 12/1998 | Woodle et al. |
| 5,849,490 A | 12/1998 | Schonwetter et al. |
| 5,861,159 A | 1/1999 | Pardoll et al. |
| 5,871,710 A | 2/1999 | Bogdanov et al. |
| 5,875,776 A | 3/1999 | Vaghefi |
| 5,883,074 A | 3/1999 | Boggs et al. |
| 5,891,468 A | 4/1999 | Martin et al. |
| 5,922,350 A | 7/1999 | Janoff et al. |
| 5,939,096 A | 8/1999 | Clerc et al. |
| 5,945,122 A | 8/1999 | Abra et al. |
| 5,957,389 A | 9/1999 | Wunderlich et al. |
| 5,958,449 A | 9/1999 | Hersch et al. |
| 5,965,549 A | 10/1999 | Purwar et al. |
| 5,972,379 A | 10/1999 | Guo et al. |
| 5,993,850 A | 11/1999 | Sankaram et al. |
| 6,000,394 A | 12/1999 | Blaha-Schnabel et al. |
| 6,045,828 A | 4/2000 | Bystrom et al. |
| 6,051,251 A | 4/2000 | Zalipsky et al. |
| 6,051,549 A | 4/2000 | Roberts et al. |
| 6,083,530 A | 7/2000 | Mayer et al. |
| 6,085,741 A | 7/2000 | Becker |
| 6,086,851 A | 7/2000 | Boni et al. |
| 6,090,407 A | 7/2000 | Knight et al. |
| 6,093,730 A | 7/2000 | Weidmann et al. |
| 6,106,479 A | 8/2000 | Wunderlich et al. |
| 6,106,858 A | 8/2000 | Ye et al. |
| 6,124,273 A | 9/2000 | Drohan et al. |
| 6,147,060 A | 11/2000 | Zasloff et al. |
| 6,162,462 A | 12/2000 | Bolotin et al. |
| 6,176,237 B1 | 1/2001 | Wunderlich et al. |
| 6,197,333 B1 | 3/2001 | Onyuksel et al. |
| 6,211,162 B1 | 4/2001 | Dale et al. |
| 6,221,385 B1 | 4/2001 | Camu et al. |
| 6,221,388 B1 | 4/2001 | Hersch et al. |
| 6,228,346 B1 | 5/2001 | Zhang et al. |
| 6,228,393 B1 | 5/2001 | DiCosmo et al. |
| 6,235,177 B1 | 5/2001 | Borland et al. |
| 6,274,175 B1 | 8/2001 | Gombotz et al. |
| 6,316,024 B1 | 11/2001 | Allen et al. |
| 6,338,859 B1 | 1/2002 | Leroux et al. |
| 6,348,069 B1 | 2/2002 | Vacanti et al. |
| 6,352,996 B1 | 3/2002 | Cao et al. |
| 6,355,267 B1 | 3/2002 | Collins |
| 6,387,886 B1 | 5/2002 | Montgomery et al. |
| 6,419,901 B2 | 7/2002 | Placke et al. |
| 6,440,393 B1 | 8/2002 | Waldrep et al. |
| 6,443,898 B1 | 9/2002 | Unger et al. |
| 6,447,753 B2 | 9/2002 | Edwards et al. |
| 6,451,784 B1 | 9/2002 | Placke et al. |
| 6,458,373 B1 | 10/2002 | Lambert et al. |
| 6,468,532 B1 | 10/2002 | Hsei et al. |
| 6,475,779 B2 | 11/2002 | Mathiowitz et al. |
| 6,481,438 B1 | 11/2002 | Gallem et al. |
| 6,492,560 B2 | 12/2002 | Wilbur et al. |
| 6,497,901 B1 | 12/2002 | Royer |
| 6,509,323 B1 | 1/2003 | Davis et al. |
| 6,511,676 B1 | 1/2003 | Boulikas |
| 6,513,727 B1 | 2/2003 | Jaser et al. |
| 6,518,243 B1 | 2/2003 | Kahne et al. |
| 6,521,211 B1 | 2/2003 | Unger et al. |
| 6,521,736 B2 | 2/2003 | Watterson et al. |
| 6,534,018 B1 | 3/2003 | Baker et al. |
| 6,546,927 B2 | 4/2003 | Litherland et al. |
| 6,554,201 B2 | 4/2003 | Klimowicz et al. |
| 6,596,305 B1 | 7/2003 | Edgerly-Plug |
| 6,599,912 B1 | 7/2003 | Au et al. |
| 6,606,990 B2 | 8/2003 | Stapleton et al. |
| 6,613,352 B2 | 9/2003 | Lagace et al. |
| 6,615,824 B2 | 9/2003 | Power |
| 6,623,671 B2 | 9/2003 | Coe et al. |
| 6,629,646 B1 | 10/2003 | Ivri |
| 6,676,034 B1 | 1/2004 | Tanaka et al. |
| 6,679,251 B1 | 1/2004 | Gallem et al. |
| 6,759,057 B1 | 7/2004 | Weiner et al. |
| 6,770,291 B2 | 8/2004 | Smyth-Templeton et al. |
| 6,843,942 B2 | 1/2005 | Katinger et al. |
| 6,845,770 B2 | 1/2005 | Klimowicz et al. |
| 6,855,296 B1 | 2/2005 | Baker et al. |
| 6,890,555 B1 | 5/2005 | Desai et al. |

(56) References Cited

U.S. PATENT DOCUMENTS

| | | |
|---|---|---|
| 6,900,184 B2 | 5/2005 | Cohen et al. |
| 6,915,962 B2 | 7/2005 | Power et al. |
| 6,916,490 B1 | 7/2005 | Garver et al. |
| 6,948,491 B2 | 9/2005 | Loeffler et al. |
| 6,962,151 B1 | 11/2005 | Knoch et al. |
| 6,983,747 B2 | 1/2006 | Gallem et al. |
| 6,991,809 B2 | 1/2006 | Anderson |
| 7,059,320 B2 | 6/2006 | Feiner et al. |
| 7,063,860 B2 | 6/2006 | Chancellor et al. |
| 7,077,126 B2 | 7/2006 | Kummer et al. |
| 7,100,600 B2 | 9/2006 | Loeffler et al. |
| 7,104,463 B2 | 9/2006 | Litherland et al. |
| 7,131,440 B2 | 11/2006 | Sonntag |
| 7,244,413 B2 | 7/2007 | Barbera-Guillem |
| 7,252,085 B2 | 8/2007 | Kunschir |
| 7,255,106 B2 | 8/2007 | Gallem et al. |
| 7,297,344 B1 | 11/2007 | Fleischer et al. |
| 7,331,339 B2 | 2/2008 | Smith et al. |
| 7,368,102 B2 | 5/2008 | Tarara et al. |
| D583,928 S | 12/2008 | Knoch |
| 7,458,372 B2 | 12/2008 | Feiner et al. |
| 7,472,701 B2 | 1/2009 | Pfichner et al. |
| 7,544,369 B2 | 6/2009 | Boni et al. |
| 7,600,511 B2 | 10/2009 | Power et al. |
| 7,686,014 B2 | 3/2010 | Boehm et al. |
| 7,718,189 B2 | 5/2010 | Boni et al. |
| 7,748,377 B2 | 7/2010 | Smith et al. |
| 7,758,886 B2 | 7/2010 | Jauernig et al. |
| 7,771,642 B2 | 8/2010 | Power et al. |
| 7,779,838 B2 | 8/2010 | Hetzer et al. |
| 7,879,351 B2 | 2/2011 | Li et al. |
| 7,891,352 B2 | 2/2011 | Gallem et al. |
| 7,931,212 B2 | 4/2011 | Urich et al. |
| D638,117 S | 5/2011 | Eckstein et al. |
| 7,958,887 B2 | 6/2011 | Kelliher et al. |
| 7,971,588 B2 | 7/2011 | Fink et al. |
| 7,980,247 B2 | 7/2011 | Boehm et al. |
| 8,006,698 B2 | 8/2011 | Boehm et al. |
| 8,071,127 B2 | 12/2011 | Cipolla et al. |
| D652,908 S | 1/2012 | Eckstein et al. |
| 8,100,162 B2 | 1/2012 | Joern et al. |
| 8,113,194 B2 | 2/2012 | Boehm et al. |
| 8,119,156 B2 | 2/2012 | Cipolla et al. |
| D656,604 S | 3/2012 | Eckstein et al. |
| 8,226,975 B2 | 7/2012 | Weers |
| 8,263,645 B2 | 9/2012 | Keller |
| 8,268,347 B1 | 9/2012 | Cipolla et al. |
| 8,333,187 B2 | 12/2012 | Gallem et al. |
| 8,342,171 B2 | 1/2013 | Boehm et al. |
| 8,347,878 B2 | 1/2013 | Schuschnig et al. |
| 8,387,895 B2 | 3/2013 | Stangl |
| 8,398,001 B2 | 3/2013 | Borland et al. |
| D680,214 S | 4/2013 | Eckstein et al. |
| 8,414,915 B2 | 4/2013 | Cipolla et al. |
| 8,459,252 B2 | 6/2013 | Gallem et al. |
| 8,511,581 B2 | 8/2013 | Urich et al. |
| 8,596,264 B2 | 12/2013 | Sommer |
| 8,616,195 B2 | 12/2013 | Power et al. |
| 8,632,804 B2 | 1/2014 | Weers |
| 8,642,075 B2 | 2/2014 | Weers |
| 8,671,933 B2 | 3/2014 | Boehm et al. |
| 8,673,348 B2 | 3/2014 | Weers |
| 8,673,349 B2 | 3/2014 | Weers |
| 8,679,532 B2 | 3/2014 | Weers |
| 8,720,432 B2 | 5/2014 | Borgschulte et al. |
| 8,720,435 B2 | 5/2014 | Gallem et al. |
| 8,739,777 B2 | 6/2014 | Kreutzmann et al. |
| 8,802,137 B2 | 8/2014 | Boni et al. |
| 8,852,557 B2 | 10/2014 | Keller et al. |
| 8,985,100 B2 | 3/2015 | Minocchieri et al. |
| 9,016,272 B2 | 4/2015 | Gallem et al. |
| 9,027,548 B2 | 5/2015 | Borgschulte et al. |
| 9,028,864 B2 | 5/2015 | Cipolla et al. |
| 9,046,092 B2 | 6/2015 | Boehm et al. |
| 9,061,303 B2 | 6/2015 | Waldner et al. |
| 9,072,464 B2 | 7/2015 | Haartsen et al. |
| 9,078,897 B1 | 7/2015 | Cipolla et al. |
| 9,084,862 B2 | 7/2015 | Blakey et al. |
| 9,095,676 B2 | 8/2015 | Gallem et al. |
| 9,108,211 B2 | 8/2015 | Ivri |
| 9,114,081 B2 | 8/2015 | Gupta |
| 9,119,783 B2 | 9/2015 | Gupta |
| 9,119,930 B2 | 9/2015 | Kreutzmann et al. |
| 9,149,588 B2 | 10/2015 | Gordon et al. |
| 9,161,963 B2 | 10/2015 | Keller et al. |
| 9,168,556 B2 | 10/2015 | Pumm et al. |
| 9,198,859 B2 | 12/2015 | Keller et al. |
| 9,259,424 B2 | 2/2016 | Cipolla et al. |
| 9,265,900 B2 | 2/2016 | Loenner et al. |
| 9,333,214 B2 | 5/2016 | Gupta |
| 9,402,845 B2 | 8/2016 | Weers |
| 9,511,082 B2 | 12/2016 | Weers |
| 9,549,925 B2 | 1/2017 | Weers |
| 9,549,939 B2 | 1/2017 | Weers |
| 9,566,234 B2 | 2/2017 | Perkins et al. |
| 9,724,301 B2 | 8/2017 | Gupta |
| 9,737,555 B2 | 8/2017 | Gupta |
| 9,827,317 B2 | 11/2017 | Boni et al. |
| 9,895,385 B2 | 2/2018 | Eagle et al. |
| 9,925,205 B2 | 3/2018 | Malinin |
| 10,064,882 B2 | 9/2018 | Gupta |
| 10,124,066 B2 | 11/2018 | Perkins et al. |
| 10,238,675 B2 | 3/2019 | Eagle et al. |
| 10,251,900 B2 | 4/2019 | Eagle et al. |
| 10,328,071 B2 | 6/2019 | Weers |
| 10,398,719 B2 | 9/2019 | Eagle et al. |
| 10,471,149 B2 | 11/2019 | Perkins et al. |
| 10,588,918 B2 | 3/2020 | Eagle et al. |
| 10,751,355 B2 | 8/2020 | Eagle et al. |
| 10,828,314 B2 | 11/2020 | Eagle et al. |
| 11,395,830 B2 | 7/2022 | Eagle et al. |
| 11,446,318 B2 | 9/2022 | Eagle et al. |
| 11,571,386 B2 | 2/2023 | Worsham |
| 12,016,873 B2 | 6/2024 | Eagle et al. |
| 12,168,021 B2 | 12/2024 | Eagle et al. |
| 12,168,022 B2 | 12/2024 | Eagle et al. |
| 12,290,600 B2 | 5/2025 | Worsham |
| 2001/0006660 A1 | 7/2001 | Lagace et al. |
| 2002/0035061 A1 | 3/2002 | Krieger et al. |
| 2002/0039596 A1 | 4/2002 | Hartounian et al. |
| 2002/0052390 A1 | 5/2002 | Ponikau |
| 2002/0086852 A1 | 7/2002 | Cantor et al. |
| 2002/0187105 A1 | 12/2002 | Zou et al. |
| 2003/0039615 A1 | 2/2003 | Katz |
| 2003/0059375 A1 | 3/2003 | Perez-Soler et al. |
| 2003/0096774 A1 | 5/2003 | Gonda et al. |
| 2003/0099697 A1 | 5/2003 | Panzner et al. |
| 2003/0118636 A1 | 6/2003 | Friesen et al. |
| 2003/0138481 A1 | 7/2003 | Zadi |
| 2003/0148964 A1 | 8/2003 | Dunne |
| 2003/0224039 A1 | 12/2003 | Boni et al. |
| 2004/0009126 A1 | 1/2004 | Pilkiewicz et al. |
| 2004/0032037 A1 | 2/2004 | Katinger et al. |
| 2004/0089295 A1 | 5/2004 | Gallem et al. |
| 2004/0091541 A1 | 5/2004 | Unger |
| 2004/0101553 A1 | 5/2004 | Lee et al. |
| 2004/0142025 A1 | 7/2004 | MacLachlan et al. |
| 2004/0142026 A1 | 7/2004 | Boni et al. |
| 2004/0156888 A1 | 8/2004 | Jensen et al. |
| 2004/0180082 A1 | 9/2004 | Kang et al. |
| 2005/0019926 A1 | 1/2005 | Gonda et al. |
| 2005/0025822 A1 | 2/2005 | Wong et al. |
| 2005/0042341 A1 | 2/2005 | Thomas et al. |
| 2005/0113337 A1 | 5/2005 | Taneja et al. |
| 2005/0119202 A1 | 6/2005 | Kreutzer et al. |
| 2005/0207987 A1 | 9/2005 | Speirs et al. |
| 2005/0214224 A1 | 9/2005 | Weers et al. |
| 2005/0217666 A1 | 10/2005 | Fink et al. |
| 2005/0220752 A1 | 10/2005 | Charmot et al. |
| 2005/0249795 A1 | 11/2005 | Zhang et al. |
| 2006/0062738 A1 | 3/2006 | Hofmann et al. |
| 2006/0067998 A1 | 3/2006 | Kurzrock et al. |
| 2006/0073198 A1 | 4/2006 | Boni et al. |
| 2006/0110441 A1 | 5/2006 | Wong et al. |

(56) References Cited

U.S. PATENT DOCUMENTS

| | | |
|---|---|---|
| 2006/0198940 A1 | 9/2006 | McMorrow |
| 2006/0217603 A1 | 9/2006 | Nagai et al. |
| 2006/0286038 A1 | 12/2006 | Rairkar et al. |
| 2007/0065367 A1 | 3/2007 | Condos et al. |
| 2007/0077290 A1 | 4/2007 | Li et al. |
| 2007/0081963 A1 | 4/2007 | Oh et al. |
| 2007/0105758 A1 | 5/2007 | May et al. |
| 2007/0196461 A1 | 8/2007 | Weers |
| 2007/0267010 A1 | 11/2007 | Fink et al. |
| 2008/0089927 A1* | 4/2008 | Malinin .............. A61K 9/127 514/36 |
| 2008/0108104 A1 | 5/2008 | Eckstein et al. |
| 2008/0131497 A1 | 6/2008 | Perkins et al. |
| 2008/0246472 A1 | 10/2008 | Igney et al. |
| 2009/0053489 A1 | 2/2009 | Yamamura et al. |
| 2009/0104256 A1 | 4/2009 | Gupta |
| 2009/0104257 A1 | 4/2009 | Li et al. |
| 2009/0105126 A1 | 4/2009 | Li et al. |
| 2009/0269396 A1 | 10/2009 | Cipolla et al. |
| 2009/0274754 A1 | 11/2009 | Cipolla et al. |
| 2010/0068257 A1 | 3/2010 | Boni et al. |
| 2010/0196455 A1 | 8/2010 | Malinin |
| 2010/0260829 A1 | 10/2010 | Boni et al. |
| 2011/0064796 A1 | 3/2011 | Cipolla et al. |
| 2011/0150983 A1 | 6/2011 | Cipolla et al. |
| 2011/0159079 A1 | 6/2011 | Li et al. |
| 2011/0256175 A1 | 10/2011 | Hope et al. |
| 2012/0010162 A1 | 1/2012 | Norling |
| 2012/0077786 A1 | 3/2012 | Byron et al. |
| 2012/0192861 A1 | 8/2012 | Surber |
| 2012/0244206 A1 | 9/2012 | Cipolla et al. |
| 2013/0028960 A1 | 1/2013 | Weers |
| 2013/0034534 A1 | 2/2013 | Kroneberg et al. |
| 2013/0052260 A1 | 2/2013 | Weers |
| 2013/0064883 A1 | 3/2013 | Weers |
| 2013/0071468 A1 | 3/2013 | Weers |
| 2013/0071469 A1 | 3/2013 | Weers |
| 2013/0087480 A1 | 4/2013 | Stark et al. |
| 2013/0089598 A1 | 4/2013 | Gupta |
| 2013/0121918 A1 | 5/2013 | Hong et al. |
| 2013/0136788 A1 | 5/2013 | Gupta |
| 2013/0177629 A1 | 7/2013 | Martin et al. |
| 2013/0280174 A1 | 10/2013 | Lipic et al. |
| 2013/0330400 A1 | 12/2013 | Perkins et al. |
| 2013/0330440 A1 | 12/2013 | Fulgham |
| 2014/0018431 A1 | 1/2014 | Wade et al. |
| 2014/0072620 A1 | 3/2014 | Weers |
| 2014/0248335 A1 | 9/2014 | Malinin |
| 2014/0308304 A1 | 10/2014 | Manoharan et al. |
| 2014/0314835 A1 | 10/2014 | Boni et al. |
| 2014/0348900 A1* | 11/2014 | Zhu ..................... A61P 25/04 422/243 |
| 2014/0371293 A1 | 12/2014 | Brown et al. |
| 2015/0110855 A1 | 4/2015 | Cipolla et al. |
| 2015/0272880 A1 | 10/2015 | Seidel et al. |
| 2015/0283076 A1 | 10/2015 | Cipolla et al. |
| 2015/0283133 A1 | 10/2015 | Gonda et al. |
| 2015/0306173 A1 | 10/2015 | Chen et al. |
| 2015/0314002 A1 | 11/2015 | Perkins et al. |
| 2015/0328244 A1 | 11/2015 | Eagle et al. |
| 2016/0113927 A1 | 4/2016 | Weers |
| 2016/0120806 A1 | 5/2016 | Cipolla et al. |
| 2016/0143849 A1 | 5/2016 | Gupta |
| 2016/0151402 A1 | 6/2016 | Gupta |
| 2016/0184301 A1 | 6/2016 | Weers |
| 2016/0184302 A1 | 6/2016 | Weers |
| 2016/0271125 A1 | 9/2016 | Boni et al. |
| 2016/0317563 A1 | 11/2016 | Weers |
| 2016/0317564 A1 | 11/2016 | Weers |
| 2016/0354371 A1 | 12/2016 | Weers |
| 2017/0014342 A1 | 1/2017 | Li et al. |
| 2017/0087155 A1 | 3/2017 | Weers |
| 2017/0100420 A1 | 4/2017 | Boni et al. |
| 2017/0165374 A1 | 6/2017 | Perkins et al. |
| 2017/0196900 A1 | 7/2017 | Perkins et al. |
| 2017/0225123 A1 | 8/2017 | Ayturk et al. |
| 2017/0360816 A1 | 12/2017 | Eagle et al. |
| 2017/0360818 A1 | 12/2017 | Gupta |
| 2018/0104345 A1 | 4/2018 | Boni et al. |
| 2018/0153918 A1 | 6/2018 | Weers |
| 2018/0169124 A1 | 6/2018 | Boni et al. |
| 2018/0169125 A1 | 6/2018 | Malinin |
| 2018/0185401 A1 | 7/2018 | Eagle et al. |
| 2018/0200186 A1 | 7/2018 | Chen et al. |
| 2018/0311267 A1 | 11/2018 | Eagle et al. |
| 2018/0318326 A1 | 11/2018 | Boni et al. |
| 2018/0318327 A1 | 11/2018 | Boni et al. |
| 2018/0360864 A1 | 12/2018 | Perkins et al. |
| 2019/0008970 A1 | 1/2019 | Boni et al. |
| 2019/0022232 A1 | 1/2019 | Perkins et al. |
| 2019/0029970 A1 | 1/2019 | Lee et al. |
| 2019/0142854 A1 | 5/2019 | Boni et al. |
| 2019/0160086 A1 | 5/2019 | Eagle et al. |
| 2019/0160087 A1 | 5/2019 | Boni et al. |
| 2019/0201534 A1 | 7/2019 | Boni et al. |
| 2019/0216834 A1 | 7/2019 | Eagle et al. |
| 2020/0009171 A1 | 1/2020 | Eagle et al. |
| 2020/0268781 A1 | 8/2020 | Eagle et al. |
| 2020/0345754 A1 | 11/2020 | Eagle et al. |
| 2020/0384007 A1 | 12/2020 | Cui et al. |
| 2020/0390758 A1 | 12/2020 | Weers |
| 2021/0015750 A1* | 1/2021 | Worsham ............... B01F 23/41 |
| 2021/0113467 A1* | 4/2021 | Worsham ........... A61K 31/7036 |
| 2021/0121574 A1 | 4/2021 | Boni et al. |
| 2021/0228606 A1 | 7/2021 | Eagle et al. |
| 2021/0369752 A1 | 12/2021 | Perkins et al. |
| 2022/0016150 A1 | 1/2022 | Boni et al. |
| 2022/0395524 A1 | 12/2022 | Eagle et al. |
| 2023/0008563 A1 | 1/2023 | Boni et al. |
| 2023/0037417 A1 | 2/2023 | Eagle et al. |
| 2023/0133762 A1 | 5/2023 | Weers |
| 2023/0218529 A1 | 7/2023 | Worsham |
| 2023/0330119 A1 | 10/2023 | Eagle et al. |
| 2023/0338405 A1 | 10/2023 | Perkins et al. |
| 2024/0366643 A1 | 11/2024 | Eagle et al. |
| 2024/0369523 A1 | 11/2024 | Shaler |
| 2025/0041321 A1 | 2/2025 | Perkins et al. |
| 2025/0057863 A1 | 2/2025 | Gupta et al. |

FOREIGN PATENT DOCUMENTS

| | | |
|---|---|---|
| CA | 2215716 C | 12/1999 |
| CA | 2614764 A1 | 1/2007 |
| CA | 2838111 A1 | 6/2007 |
| CN | 1747738 A | 3/2006 |
| CN | 101267806 A | 9/2008 |
| EP | 0069307 A2 | 1/1983 |
| EP | 0274431 B1 | 5/1994 |
| EP | 0652008 A1 | 5/1995 |
| EP | 1083881 A2 | 3/2001 |
| EP | 1083886 A1 | 3/2001 |
| EP | 1190705 A1 | 3/2002 |
| EP | 1332755 A1 | 8/2003 |
| EP | 0825852 B1 | 7/2004 |
| EP | 1559431 A1 | 8/2005 |
| EP | 2199298 A1 | 6/2010 |
| EP | 2457609 A1 | 5/2012 |
| GB | 2145107 A | 3/1985 |
| JP | S63500175 A | 1/1988 |
| JP | S63239213 A | 10/1988 |
| JP | H02504362 A | 12/1990 |
| JP | H06345663 A | 12/1994 |
| JP | H10511363 A | 11/1998 |
| JP | H1180022 A | 3/1999 |
| JP | 2002318193 A | 10/2002 |
| JP | 2006028069 A | 2/2006 |
| JP | 2006514016 A | 4/2006 |
| JP | 2006514682 A | 5/2006 |
| JP | 2006515227 A | 5/2006 |
| JP | 2006517594 A | 7/2006 |
| JP | 2008531197 A | 8/2008 |
| JP | 2009502794 A | 1/2009 |
| JP | 2009532481 A | 9/2009 |
| JP | 2015517576 A | 6/2015 |

(56) References Cited

FOREIGN PATENT DOCUMENTS

| | | |
|---|---|---|
| JP | 2016505545 A | 2/2016 |
| JP | 6402097 B2 | 10/2018 |
| KR | 101358660 B1 | 2/2014 |
| UA | 27298 U | 10/2007 |
| UA | 27804 U | 11/2007 |
| WO | WO-8500968 A1 | 3/1985 |
| WO | WO-8504578 A1 | 10/1985 |
| WO | WO-8606959 A1 | 12/1986 |
| WO | WO-8700043 A1 | 1/1987 |
| WO | WO-8702219 A1 | 4/1987 |
| WO | WO-8804573 A1 | 6/1988 |
| WO | WO-8900846 A1 | 2/1989 |
| WO | WO-9109616 A1 | 7/1991 |
| WO | WO-9116882 A1 | 11/1991 |
| WO | WO-9312240 A1 | 6/1993 |
| WO | WO-9412155 A1 | 6/1994 |
| WO | WO-9412156 A1 | 6/1994 |
| WO | WO-9422430 A1 | 10/1994 |
| WO | WO-9608235 A1 | 3/1996 |
| WO | WO-9619199 A1 | 6/1996 |
| WO | WO-9619972 A1 | 7/1996 |
| WO | WO-9637194 A1 | 11/1996 |
| WO | WO-9729851 A1 | 8/1997 |
| WO | WO-9930686 A1 | 6/1999 |
| WO | WO-9951202 A2 | 10/1999 |
| WO | WO-9961003 A1 | 12/1999 |
| WO | WO-9965466 A1 | 12/1999 |
| WO | WO-0027359 A1 | 5/2000 |
| WO | WO-0029103 A1 | 5/2000 |
| WO | WO-0045791 A2 | 8/2000 |
| WO | WO-0100173 A1 | 1/2001 |
| WO | WO-0105373 A1 | 1/2001 |
| WO | WO-0115678 A2 | 3/2001 |
| WO | WO-0118280 A1 | 3/2001 |
| WO | WO-0132246 A1 | 5/2001 |
| WO | WO-0232400 A1 | 4/2002 |
| WO | WO-0243699 A2 | 6/2002 |
| WO | WO-03045965 A2 | 6/2003 |
| WO | WO-03075889 A1 | 9/2003 |
| WO | WO-03075890 A1 | 9/2003 |
| WO | WO-2004002453 A1 | 1/2004 |
| WO | WO-2004047802 A2 | 6/2004 |
| WO | WO-2004054499 A2 | 7/2004 |
| WO | WO-2004071466 A2 | 8/2004 |
| WO | WO-2004091623 A1 | 10/2004 |
| WO | WO-2004110346 A2 | 12/2004 |
| WO | WO-2004110493 A2 | 12/2004 |
| WO | WO-2005019472 A1 | 3/2005 |
| WO | WO-2006096303 A2 | 9/2006 |
| WO | WO-2006108556 A2 | 10/2006 |
| WO | WO-2007011940 A2 | 1/2007 |
| WO | WO-2007012191 A1 | 2/2007 |
| WO | WO-2007067520 A2 | 6/2007 |
| WO | WO-2007117509 A2 | 10/2007 |
| WO | WO-2007117550 A2 | 10/2007 |
| WO | WO-2008039989 A2 | 4/2008 |
| WO | WO-2008063341 A2 | 5/2008 |
| WO | WO-2008137717 A1 | 11/2008 |
| WO | WO-2008137917 A1 | 11/2008 |
| WO | WO-2009045116 A1 | 4/2009 |
| WO | WO-2009055568 A2 | 4/2009 |
| WO | WO-2009055571 A2 | 4/2009 |
| WO | WO-2009126502 A2 | 10/2009 |
| WO | WO-2010045209 A2 | 4/2010 |
| WO | WO-2010111641 A2 | 9/2010 |
| WO | WO-2011050206 A2 | 4/2011 |
| WO | WO-2011108955 A1 | 9/2011 |
| WO | WO-2011153323 A2 | 12/2011 |
| WO | WO-2012050945 A1 | 4/2012 |
| WO | WO-2012069531 A2 | 5/2012 |
| WO | WO-2012159103 A1 | 11/2012 |
| WO | WO-2012168181 A1 | 12/2012 |
| WO | WO-2013086373 A1 | 6/2013 |
| WO | WO-2013177226 A1 | 11/2013 |
| WO | WO-2014025890 A1 | 2/2014 |
| WO | WO-2014052634 A1 | 4/2014 |
| WO | WO-2014085526 A1 | 6/2014 |
| WO | WO-2015017807 A1 | 2/2015 |
| WO | WO-2015175939 A1 | 11/2015 |
| WO | WO-2016033546 A1 | 3/2016 |
| WO | WO-2016149625 A1 | 9/2016 |
| WO | WO-2017008076 A1 | 1/2017 |
| WO | WO-2017087876 A1 | 5/2017 |
| WO | WO-2017118836 A1 | 7/2017 |
| WO | WO-2019191627 A1 | 10/2019 |
| WO | WO-2019213398 A1 | 11/2019 |
| WO | WO-2022261174 A1 | 12/2022 |

OTHER PUBLICATIONS

Abranches, J. et al. (Apr. 2009), "Invasion of human coronary artery endothelial cells by *Streptococcus mutans* OMZ175," Oral Microbiol Immunol; 24(2):141-145. doi:10.1111/j.1399-302X.2008.00487.x.

Ahmad, S. et al. (2010), "Azithromycin effectiveness against intracellular infections of Francisella," BMC Microbiology, 10:123, 15 pages.

Alhajlan, M. et al. (2013), "Efficacy and Safety of Liposomal Clarithromycin and Its Effect on Pseudomonas aeruginosa Virulence Factors," Antimicrobial Agents and Chemotherapy, vol. 57, No. 6, pp. 2694-2704.

Allen, T. M. et al. (1983), "Effect of liposome size and drug release properties of pharmacokinetics of encapsulated drug to rats," The Journal of Pharmacology and Experimental Therapeutics, 226(2):539-544.

Alton et al. (1999), "Cationic lipid-mediated CFTR gene transfer to the lungs and nose of patients with cystic fibrosis: a double-blind placebo-controlled trial," The Lancet, 353(9157):947-954.

Amikacin—DrugBank Accession No. DB00479 (APRD00550) [online], https://www.drugbank.ca/drugs/DB00479. Retrieved on Apr. 14, 2017, 10 pages.

Anacona et al. (2001), "Synthesis and antibacterial activity of metal complexes of ciprofloxacin," Transition Metal Chemistry 26:228-231.

Anderson, K. E. et al. (2001), "Formulation and Evaluation of a Folic Acid Receptor-Targeted Oral Vancomycin Liposomal Dosage Form," Pharmaceutical Research, 18(3):316-322.

Andrews, J. M. (2001), "Determination of minimum inhibitory concentrations," Journal of Antimicrobial Chemotherapy, 48(S1):5-14.

Antos, M. et al. (1995), "Antibacterial activity of liposomal amikacin against Pseudomonas aeruginosa in vitro," Pharmacological Research, 32(1/2):84-87.

Bahar, A. A. et al. (2013), "Antimicrobial peptides," Pharmaceuticals, 6:1543-1575; doi:10.3390/ph6121543.

Bakker-Woudenberg et al. (2001), Improved efficacy of ciprofloxacin administered in polyethylene glycol-coated liposomes for treatment of Klebsiella pneumoniae pneumonia in rats. Antimicrobial Agents and Chemotherapy 45(5), pp. 1487-1492.

Bakker-Woudenberg et al. (2002), Ciprofloxacin in polyethylene glycol-coated liposomes: efficacy in rat models of acute or chronic Pseudomonas aeruginosa infection. Antimicrobial Agents and Chemotherapy 46(8):2575-2581.

Bakker-Woudenberg, I. A. J. M. et al. (2005), "Long-Circulating Sterically Stabilized Liposomes in the Treatment of Infections," Method in Enzymology, Available online Feb. 21, 2005, 391:228-260.

Bakker-Woudenberg, I. et al. (1995), "Efficacy of gentamicin or ceftazidine entrapped in liposomes with prolonged blood circulation and enhanced localization in Klebsiella pneumoniae-infected lung tissue," The Journal Infectious Diseases, 171:938-947.

Ball, V. et al. (2002), "Complexation mechanism of bovine serum albumin and poly(allylamine hydrochloride)," J. Phys. Chem. B., 106(9):2357-2364.

Bangham, A. D. (1983), Introduction, "Liposomes: An Historical Perspective," in: Liposomes, Ostro, M. J. (ed.), Marcel Dekker, Inc., New York, pp. 1-25.

Bangham et al. (1965), "Diffusion of univalent ions across the lamellae of swollen phospholipids," J. Mol. Biol. 13(1):238-252.

(56) References Cited

OTHER PUBLICATIONS

Bargoni, A. et al. (2001), "Transmucosal transport of tobramycin incorporated in solid lipid nanoparticles (SLN) after duodenal administration to rats. Part II—Tissue distribution," Pharmacological Research, 43(5):497-502.
Beaulac, C. et al. (1996), "Eradication of Mucoid Pseudomonas aeruginosa with Fluid Liposome-Encapsulated Tobramycin in an Animal Model of Chronic Pulmonary Infection," Antimicrobial Agents and Chemotherapy, 40(3):665-669.
Beaulac, C. et al. (1997), "In vitro kinetics of drug release and pulmonary retention of microencapsulated antibiotic in liposomal formulations in relation to the lipid composition," Journal Microencapsulation 14(3):335-348.
Beaulac, C. et al. (1998), "In-vitro bactericidal efficacy of sub-MIC concentrations of liposome-encapsulated antibiotic against Gram-negative and Gram-positive bacteria," Journal of Antimicrobial Chemotherapy, 41:35-41.
Beaulac, C. et al. (1999), "Aerolization of low phase transition temperature liposomal tobramycin as a dry powder in an animal model of chronic pulmonary infection caused by Pseudomonas aeruginosa," Journal Drug Targeting, 7(1):33-41.
Bedard, J. et al. (Aug. 1989), "Interaction of the fluoroquinolone antimicrobial agents ciprofloxacin and enoxacin with liposomes," Antimicrobial Agents and Chemotherapy, vol. 33, No. 8, pp. 1379-1382.
Bermudez, L. E. et al. (1990), "Treatment of disseminated *Mycobacterium avium* complex infection of beige mice with liposome-encapsulated aminoglycosides," The Journal of Infectious Diseases, 161(6):1262-1268.
Betageri, G. V. et al. (1993), Liposome Drug Delivery Systems, Technomic Publishing Co., Inc., 32 pages.
Bhavane, R. (Aug. 2006). Nanoparticle agglomerates for pulmonary drug delivery. A dissertation presented to the faculty of the University of Texas Health Science Center at Houston of Health Information Sciences. UMI No. 3237380, 160 pages.
Bhavane, R. et al. (Nov. 2003), "Agglomerated vesicle technology: a new class of particles for controlled and modulated pulmonary drug delivery," Journal of Controlled Release 93(1):15-28.
Biller, J. A. et al. (2015), "Efficacy of Liposomal Amikacin for Inhalation (LAI) in Achieving Nontuberculous Mycobacteria (NTM) Culture Negativity In Patients Whose Lung Infection Is Refractory to Guideline-Based Therapy," Poster presented at the ATS 2015 International Conference, May 15-20, 2015, Denver, CO, USA, 1 page.
Biller, J. A. et al. (May 2015), "Efficacy of Liposomal Amikacin for Inhalation (LAI) in Achieving Nontuberculous Mycobacteria (NTM) Culture Negativity in Patients Whose Lung Infection Is Refractory to Guideline-Based Therapy," Abstract, D108 Diagnosis and Management of Nontuberculous Mycobacteria Infections, Poster Discussion Session, Colorado Convention Center, Am J Respir Crit Care Med 191;2015:A6295, Online Abstracts Issue, 1 page.
Bilodeau, M. et al. (1963), "Kanamycin aerosol therapy in 200 cases of bronchopulmonary suppurations," Can. Med. Assoc. J., 89:537-541, with English Abstract.
Bilton, D. et al. (Oct. 2014), "Phase 3 Efficacy and Safety Data from Randomized, Multicenter Study of Liposomal Amikacin for Inhalation (Arikace) Compared with TOBI in Cystic Fibrosis Patients with Chronic Infection Due to Pseudomanas aeruginosa," Poster 235, North American Cystic Fibrosis Conference, Salt Lake City, Utah, 1 page.
Blaser, J. et al. (1995), "Once daily dosing of aminoglycosides," Eur. Clin. Microbiol. Infect. Dis., 14(12):1029-1038.
Bolotin, E. M. et al. (1994), "Ammonium Sulfate Gradients for Efficient and Stable Remote Loading of Amphipathic Weak Bases into Liposomes and Ligandoliposomes," Journal of Liposome Research, vol. 4(1), pp. 455-479.
British Thoracic Society Nebuliser Project Group, Thorax, 1997, vol. 52 (Suppl. 2), S1-S24.
Bruinenberg, P. (2010), "Safety, tolerability and pharmacokinetics of novel liposomal ciprofloxacin of novel liposomal ciprofloxacin formulations for inhalation in healthy volunteers and in non-cystic bronchiectasis patients," Am. J. Respir. Crit. Care Med, 181:A3192, 1 page.
Bruinenberg, P. et al. (2010), "Inhaled Liposomal Ciprofloxacin: Once a Day Management of Respiratory Infections," Respiratory Drug Delivery, 1:73-82.
Bucke, W. E. et al. (1997), "Surface-modified amikacin-liposomes: organ distribution and interaction with plasma proteins," Journal of Drug Targeting, 5(2):99-108.
Bunderberg de Jong, H. G. et al. (1930), "Koazevation (Entmischung in Kolloidalen Systemen)," Koll. Zeitsch, 50(10):39-48.
Cabanes et al. (1995), "Sustained release of liposome-encapsulated enrofloxacin after intramuscular administration in rabbits," American Journal of Veterinary Research, 56(11):1498-501.
Cantin, A. M. et al. (1999), "Aerosolized prolastin suppresses bacterial proliferation in a model of chronic pseudomonas aeruginosa lung infection," Am. J. Respir. Crit. Care Med., 160:1130-1135.
Carlier, M. B. et al. (1983), "Inhibition of lysosomal phospholipases by aminoglycoside antibiotics: in vitro comparative studies," Antimicrobial Agents and Chemotherapy, 23(3):440-449.
Carter, G. (2003), "Characterization of biofilm formation by *Mycobacterium avium* strains," J. Med. Microbial, 52:747-52.
Cash, H. A. et al. (1979), "A rat model of chronic respiratory infection with Pseudomonas aeruginosa," American Review of Respiratory Disease, 119(3):453-459.
Challoner, P. B. et al. (2001), "Gamma Scintigraphy Lung Deposition Comparison of TOBI in the PARI LC Plus Nebulizer and the Aerodose Inhaler," American Thoracic Society 97th International Conference, San Francisco, California, Aerogen, Inc., 1 page.
Chambless, J. D. et al. (2006), "A three-dimensional computer model of four hypothetical mechanisms protecting biofilms from antimicrobials," Appl. Environ. Microbiol., 72(3):2005-2013.
Chan, C. H. S. et al. (1992), "Mycobacteria as a cause of infective exacerbation in bronchiectasis," Postgrad. Med. J., 68:896-899.
Chapman, D. (1984), "Physicochemical Properties of Phospholipids and Lipid-Water Systems," In: Liposome Technology, Chapter 1, vol. I, Preparation of Liposomes, Gregoriadis G. (ed.), CRC Press, Inc., Boca Raton, Florida, pp. 1-18.
Chen et al. (Jul. 2018), "Photoresponsive endosomal escape enhances gene delivery using liposome-polycation-DNA (LPD) nanovector," Journal of Materials Chemistry B., No. 32, pp. 1-35.
Chi, F. et al. (2010), "Vimentin-mediated signalling is required for IbeA+ *E. coli* K1 invasion of human brain microvascular endothelial cells," Biochem. J., vol. 427, pp. 79-90.
Chmiel, J. F. et al. (2003), "State of the art: why do the lungs of patients with cystic fibrosis become infected and why can't they clear the infection?", Respiratory Research, vol. 4, pp. 8-20.
Chono, S, et al. (2006), "Influence of particle size on drug delivery to rat alveolar macrophages following pulmonary administration of ciprofloxacin incorporated into liposomes," Journal of Drug Targeting, 14(8):557-566.
Chuchalin et al. (2007), "A formulation of aerosolized tobramycin (Bramitob) in the treatment of patients with cystic fibrosis and Pseudomonas aeruginosa infection: a double-blind, placebo-controlled, multicenter study," Paediatric Drugs, 9(Suppl. 1), pp. 21-31.
Ciofu, O. et al. (Jun. 2005), "Occurrence of Hypermutable Pseudomonas aeruginosa in Cystic Fibrosis Patients Is Associated with the Oxidative Stress Caused by Chronic Lung Inflammation," Antimicrobial Agents and Chemotherapy, 49(6):2276-2282.
Cipolla, D. (2013), "Liposomal Formulations for Inhalation," Ther. Deliv., 4(8):1047-1072.
Cipolla, D. (2014), "Development and Characterization of an In Vitro Release Assay for Liposomal Ciprofloxacin for Inhalation," J. Pharm. Sci., 103(1):314-327.
Cipolla, D. et al. (2016), "Development of Liposomal Ciprofloxacin to Treat Lung Infections," Pharmaceutics, vol. 8, No. 1, 31 pages.
Cipolla et al. (1994), "Assessment of aerosol delivery systems for recombinant human deoxyribonuclease," S.T.P. Pharma Sciences, 4(1), pp. 50-62.
Cipro I.V. Label (Jan. 2005), 26 pages.
Cipro Products FDA Approval Letter (Mar. 2004), 4 pages.

(56) References Cited

OTHER PUBLICATIONS

Ciprofloxacin—DrugBank, Accession No. DB00537 (APRD00424, EXPT00999) [online], https://www.drugbank.ca/drugs/DB00537. Retrieved on Apr. 14, 2017, 19 pages.

Clancy, J. P. et al. (2013), "Phase II studies of nebulised Arikace in CF patients with Pseudomonas aeruginosa infection," Thorax, 68(9):818-825.

Clay. M. M. et al. (1983), "Assessment of jet nebulisers for lung aerosol therapy," Lancet, 2:592-594.

Clinical Trials Identifier: NCT00558844. ClinicalTrials.gov submitted on Apr. 22, 2009, pp. 5.

Clinical Trials Identifier: NCT00558844. ClinicalTrials.gov submitted on Jul. 14, 2009, pp. 5.

Clinical Trials Identifier: NCT00558844. ClinicalTrials.gov submitted on May 3, 2012, pp. 5.

Clinical Trials Identifier: NCT00558844. ClinicalTrials.gov submitted on Nov. 13, 2007, pp. 6.

Clinical Trials Identifier: NCT00558844. ClinicalTrials.gov submitted on Oct. 14, 2008, pp. 5.

Clinical Trials Identifier: NCT00775138. ClinicalTrials.gov submitted on Apr. 22, 2009, pp. 7.

Clinical Trials Identifier: NCT00775138. ClinicalTrials.gov submitted on Feb. 12, 2015, pp. 7.

Clinical Trials Identifier: NCT00775138. ClinicalTrials.gov submitted on Jul. 14, 2009, pp. 7.

Clinical Trials Identifier: NCT00775138. ClinicalTrials.gov submitted on May 31, 2012, pp. 7.

Clinical Trials Identifier: NCT00775138. ClinicalTrials.gov submitted on Oct. 16, 2008, pp. 8.

Clinical Trials Identifier: NCT00777296. ClinicalTrials.gov submitted on May 3, 2012, pp. 6.

Clinical Trials Identifier: NCT00777296. ClinicalTrials.gov submitted on Nov. 30, 2010, pp. 6.

Clinical Trials Identifier: NCT00777296. ClinicalTrials.gov submitted on Oct. 21, 2008, pp. 6.

Clinical Trials Identifier: NCT01315236. ClinicalTrials.gov submitted on Apr. 5, 2013, pp. 7.

Clinical Trials Identifier: NCT01315236. ClinicalTrials.gov submitted on Aug. 20, 2012, pp. 7.

Clinical Trials Identifier: NCT01315236. ClinicalTrials.gov submitted on Aug. 5, 2011, pp. 5.

Clinical Trials Identifier: NCT01315236. ClinicalTrials.gov submitted on Feb. 10, 2012, pp. 6.

Clinical Trials Identifier: NCT01315236. ClinicalTrials.gov submitted on Feb. 12, 2015, pp. 7.

Clinical Trials Identifier: NCT01315236. ClinicalTrials.gov submitted on Jul. 18, 2012, pp. 7.

Clinical Trials Identifier: NCT01315236. ClinicalTrials.gov submitted on Jul. 23, 2012, pp. 7.

Clinical Trials Identifier: NCT01315236. ClinicalTrials.gov submitted on Jul. 27, 2012, pp. 7.

Clinical Trials Identifier: NCT01315236. ClinicalTrials.gov submitted on Jul. 3, 2012, pp. 7.

Clinical Trials Identifier: NCT01315236. ClinicalTrials.gov submitted on Jul. 31, 2012, pp. 7.

Clinical Trials Identifier: NCT01315236. ClinicalTrials.gov submitted on Jun. 28, 2012, pp. 7.

Clinical Trials Identifier: NCT01315236. ClinicalTrials.gov submitted on Mar. 13, 2011, pp. 6.

Clinical Trials Identifier: NCT01315236. ClinicalTrials.gov submitted on Mar. 15, 2011, pp. 6.

Clinical Trials Identifier: NCT01315236. ClinicalTrials.gov submitted on May 1, 2012, pp. 6.

Clinical Trials Identifier: NCT01315236. ClinicalTrials.gov submitted on May 14, 2012, pp. 6.

Clinical Trials Identifier: NCT01315236. ClinicalTrials.gov submitted on May 17, 2012, pp. 6.

Clinical Trials Identifier: NCT01315236. ClinicalTrials.gov submitted on May 31, 2012, pp. 6.

Clinical Trials Identifier: NCT01315236. ClinicalTrials.gov submitted on Nov. 13, 2012, pp. 7.

Clinical Trials Identifier: NCT01315236. ClinicalTrials.gov submitted on Oct. 11, 2012, pp. 7.

Clinical Trials Identifier: NCT01315236. ClinicalTrials.gov submitted on Oct. 12, 2012, pp. 7.

Clinical Trials Identifier: NCT01315236. ClinicalTrials.gov submitted on Oct. 9, 2012, pp. 7.

Clinical Trials Identifier: NCT01315236. ClinicalTrials.gov submitted on Sep. 14, 2012, pp. 7.

Clinical Trials Identifier: NCT01315236. ClinicalTrials.gov submitted on Sep. 3, 2013, pp. 7.

Clinical Trials Identifier: NCT01315678. ClinicalTrials.gov submitted on Aug. 5, 2011, pp. 5.

Clinical Trials Identifier: NCT01315678. ClinicalTrials.gov submitted on Feb. 12, 2015, pp. 7.

Clinical Trials Identifier: NCT01315678. ClinicalTrials.gov submitted on Feb. 21, 2012, pp. 5.

Clinical Trials Identifier: NCT01315678. ClinicalTrials.gov submitted on Jul. 11, 2012, 6 pages.

Clinical Trials Identifier: NCT01315678. ClinicalTrials.gov submitted on Mar. 19, 2012, pp. 5.

Clinical Trials Identifier: NCT01315678. ClinicalTrials.gov submitted on Mar. 30, 2015, pp. 7.

Clinical Trials Identifier: NCT01315678. ClinicalTrials.gov submitted on Mar. 4, 2014, pp. 6.

Clinical Trials Identifier: NCT01315678. ClinicalTrials.gov submitted on Mar. 14, 2011, pp. 5.

Clinical Trials Identifier: NCT01315678. ClinicalTrials.gov submitted on Mar. 16, 2011, pp. 5.

Clinical Trials Identifier: NCT01315678. ClinicalTrials.gov submitted on Nov. 20, 2012, pp. 6.

Clinical Trials Identifier: NCT01315691. ClinicalTrials.gov submitted on Aug. 22, 2012, pp. 6.

Clinical Trials Identifier: NCT01315691. ClinicalTrials.gov submitted on Aug. 5, 2011, pp. 5.

Clinical Trials Identifier: NCT01315691. ClinicalTrials.gov submitted on Jan. 9, 2015, pp. 5.

Clinical Trials Identifier: NCT01315691. ClinicalTrials.gov submitted on Mar. 14, 2011, pp. 6.

Clinical Trials Identifier: NCT01315691. ClinicalTrials.gov submitted on Mar. 16, 2011, pp. 6.

Clinical Trials Identifier: NCT01315691. ClinicalTrials.gov submitted on Mar. 25, 2011, pp. 6.

Clinical Trials Identifier: NCT01316276. ClinicalTrials.gov submitted on Aug. 5, 2011, pp. 4.

Clinical Trials Identifier: NCT01316276. ClinicalTrials.gov submitted on Dec. 11, 2012, pp. 4.

Clinical Trials Identifier: NCT01316276. ClinicalTrials.gov submitted on Feb. 12, 2015, pp. 6.

Clinical Trials Identifier: NCT01316276. ClinicalTrials.gov submitted on Mar. 14, 2011, pp. 4.

Clinical Trials Identifier: NCT01316276. ClinicalTrials.gov submitted on Mar. 16, 2012, pp. 4.

Clinical Trials Identifier: NCT02344004. ClinicalTrials.gov submitted on Apr. 2, 2015, pp. 5.

Clinical Trials Identifier: NCT02344004. ClinicalTrials.gov submitted on Jan. 16, 2015, pp. 4.

Clinical Trials Identifier: NCT02344004. ClinicalTrials.gov submitted on Mar. 20, 2015, pp. 4.

Clinicaltrials.gov, "Safety and Efficacy Study of Ciprofloxacin for Inhalation in Patients With Non-Cystic Fibrosis Bronchiectasis 'ORBIT-1'", Identifier: NCT00889967, 3 pages.

Colardyn, F. (1995), "The efficacy and safety of isepamicin and ceftazidime compared with amikacin and ceftazidime in acute lower respiratory tract infection," Journal of Chemotherapy, 7(2):129-135.

Coleman, L. T. et al. (1995), "Bronchiectasis in children," Journal of Thoracic Imaging, 10(4)268-279.

Colman, P.M. (1994) "Effects of amino acid sequence changes on antibody-antigen interactions" Research in Immunology, 145(1):33-36.

Comis, R. L., (1993), "Carboplatin in the treatment of non-small cell lung cancer: a review," Oncology, 50(2):37-41.

(56) References Cited

OTHER PUBLICATIONS

Conley et al. (Jun. 1997), "Aerosol Delivery of Liposome-Encapsulated Ciprofloxacin: Aerosol Characterization and Efficacy against Francisella tularensis Infection in Mice," Antimicrobial Agents and Chemotherapy, 41(6):1288-1292.
Cooksey, R. C. et al. (1978), "Antimicrobial susceptibility patterns of Streptococcus pneumoniae," Antimicrobial Agents and Chemotherapy, 13(4):645-648.
Cordeiro, C. et al. (Mar. 2000), "Antibacterial Efficacy of Gentamicin Encapsulated in pH-Sensitive Liposomes against an In Vivo Salmonella enterica Serovar Typhimurium Intracellular Infection Model," Antimicrobial Agents and Chemotherapy, vol. 44, No. 3, pp. 533-539.
Costerton, J. W. et al. (1999), "Bacterial biofilms: A common cause of persistent infections," Science, 284:1318-1322.
Couvreur, P. et al. (1991), "Liposomes and nanoparticles in the treatment of intracellular bacterial infections," Pharmaceutical Research, 8(9):1079-1085.
Cremades, M. J. et al. (1998), "Repeated pulmonary infection by Nocardia asteroides complex in a patient with bronchiectasis," Respiration, 65:211-213.
Crowther, N. R. et al. (Sep. 1998), "Inhaled aminoglycoside (gentamicin) in bronchiectasis: Dry powder vs. nebulization vs. intravenous therapy," Clinical and Investigative Medicine, Annual Meeting of the Canadian Society for Clinical Investigation, Sep. 24-27, 1998, The Royal College of Physicians and Surgeons of Canada and Participating Societies, Toronto, Canada, Abstract 530, 3 pages.
Cullis et al. (1987), "Liposomes as Pharmaceuticals," Liposomes From Biophysics to Therapeutics, (M. Ostro ed.), pp. 39-72.
Cullis et al. (1989), "Generating and loading of liposomal systems for drug delivery applications," Advanced Drug Delivery Reviews, vol. 3, pp. 267-282.
Currie, D. C. (1997), "Nebulisers for bronchiectasis," Thorax, 52(Suppl. 2):S72-S74.
Cymbala, A. A. et al. (2005), "The Disease-Modifying Effects of Twice-Weekly Oral Azithromycin in Patients with Bronchiectasis," Treat Respir. Med ;4(2):117-122.
Cynamon, M. H. et al. (1989), "Liposome-Encapsulated-Amikacin Therapy of Mycobacterium avium Complex Infection in Geige Mice," Antimicrobial Agents and Chemotherapy, 33(8):1179-1183.
Dally, M. B. et al. (1978), "Ventilatory effects of aerosol gentamicin," Thorax, 33:54-56.
Damaso, D. et al. (1976), "Susceptibility of current clinical isolates of Pseudomonas aeruginosa and enteric gram-negative bacilli to amikacin and other aminoglycoside antibiotics," The Journal of Infectious Diseases, 134:S394-S390.
Davis, K. K. et al. (2007), "Aerosolized amikacin for treatment of pulmonary Mycobacterium avium infections: an observational case series," BMC Pulmonary Medicine, 7:2; doi:10.1186/1471-2466-7-2, 6 pages.
Deamer, D. W. et al. (1983), "Liposome Preparation: Methods and Mechanisms," Chapter 1 in: Liposomes, Ostro, M. J. (ed.), Marcel Dekker, Inc., New York, 27 pages.
Decision of the Technical Board of Appeal 3.3.07 for European Application No. 06787716.7, mailed Feb. 21, 2019, 24 pages.
Dees, C. et al. (1990), "The mechanism of enhanced intraphagocytic killing of bacteria by liposomes containing antibiotics," Veterinary Immunology and Immunopathology, vol. 24, pp. 135-146.
Del Porto, P. et al. (2011), "Dysfunctional CFTR alters the bactericidal activity of human macrophages against Pseudomonas aeruginosa," PLoS ONE, 6(5):e19970, 8 pages.
Demaeyer, P. et al. (1993), "Disposition of liposomal gentamicin following intrabronchial administration in rabbits," Journal Microencapsulation, 10(1):77-88.
Deol, P. et al. (1997), "Lung specific stealth liposomes: stability, biodistribution and toxicity of liposomal antitubular drugs in mice," Biochimica et Biophysica Acta, 1334:161-172.
Dequin, P. F. et al. (2001), "Urinary excretion reflects lung deposition of aminoglycoside aerosols in cystic fibrosis," Eur. Respir. J., 18(2):316-322.
Desai, (2003), "Delivery of liposomes in dry powder form: aerodynamic dispersion properties," European Journal of Pharmaceutical Sciences 20:459-467.
Desai et al. (2002), "A facile method of delivery of liposomes by nebulization," Journal of Controlled Release, 84(1-2):69-78.
Desai et al. (Feb. 2002), "A Novel Approach to the Pulmonary Delivery of Liposomes in Dry Powder Form to Eliminate the Deleterious Effects of Milling," Journal of Pharmaceutical Sciences, 91(2):482-491.
Desai, T. R. et al. (2001), "Determination of surface free energy of interactive dry powder liposome formulations using capillary penetration technique," Colloids and Surfaces B: Biointerfaces, 22:107-113.
Deshpande, R. G. et al. (Nov. 1998), "Invasion of Aortic and Heart Endothelial Cells by Porphyromonas gingivalis," Infection and Immunity, vol. 66, No. 11, pp. 5337-5343.
Di Ninno et al. (1993). Liposome-encapsulated ciprofloxacin is effective in the protection and treatment of BALB/c mice against Francisella tularensis. The Journal of Infectious Diseases, vol. 168, pp. 793-794.
Dickie, K. J. et al. (1973), "Ventilatory effects of aerosolized kanamycin and polymyxin," Chest, 63(5):694-697.
Dimov, N. et al. (Sep. 2017), "Formation and purification of tailored liposomes for drug delivery using a module-based micro continuous-flow system," Scientific Reports, 7:12045, 13 pages.
Domingue, G. J. et al. (Apr. 1997), "Bacterial Persistence and Expression of Disease," Clinical Microbiology Reviews, vol. 10, No. 2, pp. 320-344.
Dong, C. et al. (1993), "Acacia-gelatin microencapsulated liposomes: preparation, stability and release of acetylsalicylic acid," Pharmaceutical Research, 10(1):141-146.
Doring, G. et al. (2000), "Antibiotic therapy against Pseudomonas aeruginosa in cystic fibrosis: a European consensus," Eur Respir J., 16(4):749-767.
Dorn, B. R. et al. (Nov. 1999) "Invasion of Human Coronary Artery Cells by Periodontal Pathogens," Infection and Immunity, vol. 67, No. 11, pp. 5792-5798.
Drenkard, E. et al. (2002), "Pseudomonas biofilm formation and antibiotic resistance are linked to phenotypic variation," Nature, 416:740-743.
Driscoll et al. (2000), "Intratracheal Instillation as an Exposure Technique for the Evaluation of Respiratory Tract Toxicity: Uses and Limitations," Toxicological Sciences, 55, pp. 24-35.
Dupont et al. (Jan. 2008), "A randomized placebo-controlled study of nebulized liposomal amikacin (Arikace) in the treatment of cystic fibrosis patients with chronic Pseudomonas aeruginosa lung infection," Journal of Cystic Fibrosis, 1(7):S26, Abstract 102, 1 page.
Duzgunes, Liposomes, Part A, Methods in Enzymology, Disalvo, E. A. et al. (2003), "Interfacial properties of liposomes as measured by fluorescence and optical probes," Chapter 14, pp. 213-232.
Duzgunes, N. et al. (Nov. 1996), "Treatment of intracellular Mycobacterium avium complex infection by free and liposome-encapsulated sparfloxacin," Antimicrobial Agents and Chemotherapy, 40(11):2618-2621.
Eboka (2005), "Aqueous solubility of ciprofloxacin in the presence of metal cations," Tropical Journal of Pharmaceutical Research, 4(1), pp. 349-354.
Ehlers, S. et al. (1996), "Liposomal amikacin for treatment of M. avium Infections in clinically relevant experimental settings," Zbl. Bakt., vol. 284, pp. 218-231.
Eigen (1995), "A multicenter study of alternate-day prednisone therapy in patients with cystic fibrosis," The Journal of Pediatrics, 126(4), pp. 515-523.
El-Din, M. A. T. et al. (1994), "Nebulizer therapy with antibiotics in chronic suppurative lung disease," Journal of Aerosol Medicine, 7(4):345-350.
Elhissi et al. (Jul. 2006), "Formulations generated from ethanol-based proliposomes for delivery via medical nebulizers," Journal of Pharmacy and Pharmacology, 58:887-894.
Eller, J. M. et al. (1993), "The therapy of bronchiectasis," Deutsche Medizinische Wochenschrift, 118(44):1608-1610.
Extended European Search Report for European Application No. 03816990.0, mailed Jan. 12, 2009, 5 pages.

(56) References Cited

OTHER PUBLICATIONS

Extended European Search Report for European Application No. 06787716.7, mailed Dec. 29, 2011, 7 pages.
Extended European Search Report for European Application No. 06847502.9, mailed Dec. 5, 2012, 7 pages.
Extended European Search Report for European Application No. 07754853.5, mailed Jan. 16, 2013, 8 pages.
Extended European Search Report for European Application No. 07754936.8, mailed Jan. 18, 2013, 9 pages.
Extended European Search Report for European Application No. 08840993.3, mailed Aug. 22, 2013, 6 pages.
Extended European Search Report for European Application No. 09821103.0, mailed Aug. 12, 2015, 10 pages.
Extended European Search Report for European Application No. 13793204.2, mailed Sep. 25, 2015, 5 pages.
Extended European Search Report for European Application No. 13858844.7, mailed Jun. 15, 2016, 4 pages.
Extended European Search Report for European Application No. 14183066.1, mailed Dec. 16, 2014, 11 pages.
Extended European Search Report for European Application No. 15791964.8, mailed Dec. 11, 2017, 10 pages.
Extended European Search Report for European Application No. 16156099.0, mailed Jul. 25, 2016, 7 pages.
Extended European Search Report for European Application No. 16156100.6, mailed Jul. 25, 2016, 6 pages.
Extended European Search Report for European Application No. 16822088.7, mailed Feb. 15, 2019, 7 pages.
Extended European Search Report for European Application No. 17207115.1, mailed Jun. 1, 2018, 10 pages.
Extended European Search Report for European Application No. 18176134.7, mailed Nov. 22, 2018, 12 pages.
Extended European Search Report for European Application No. 18203799.4, mailed Mar. 13, 2019, 14 pages.
Extended European Search Report for European Application No. 19167132.0, mailed Nov. 20, 2019, 8 pages.
Extended European Search Report for European Application No. 19774338.8, mailed Nov. 19, 2021, 8 pages.
Extended European Search Report for European Application No. 19797021.3, mailed Feb. 22, 2022, 8 pages.
Extended European Search Report for European Application No. 20159434.8, mailed Aug. 12, 2020, 7 pages.
Extended European Search Report for European Application No. 20182665.8, mailed Dec. 23, 2020, 9 pages.
Extended European Search Report for European Application No. 22182229.9, mailed Dec. 8, 2022, 10 pages.
Extended European Search Report for European Application No. 24163449.2 mailed Jun. 26, 2024, 12 pages.
Extended European Search Report for European Patent Application No. 11159754.8, mailed Jun. 22, 2011, 5 pages.
Extended European Search Report for European Patent Application No. 13175824.5, mailed Sep. 16, 2013, 8 pages.
Falkinham, J. O., III et al. (2008), "*Mycobacterium avium* in a shower linked to pulmonary disease," Journal of Water and Health, Jun. 2, 2008, pp. 209-213.
Farber, J. E. et al. (1950), "The use of aerosol penicillin and streptomycin in bronchopulmonary infections," California Medicine, 73(3):214-217.
Fenske et al. ( 2003), "Encapsulation of weakly-basic drugs, antisense oligonucleotides, and plasmid DNA within large unilamellar vesicles for drug delivery applications," Liposomes Second Edition A Practical Approach, pp. 167-191 (V. Torchilin et al. eds.,).
Fielding, R. M. et al. (1999), "Pharmacokinetics and Urinary Excretion of Amikacin in Low-Clearance Unilamellar Liposomes after a Single or Repeated Intravenous Administration in the Rhesus Monkey, " Antimicrobial Agents and Chemotherapy, 43(3):503-509.
Finke, W. (1954), "Long-term antibiotic therapy in chronic bronchitis and infectious asthma. Control and prevention of bronchopulmonary disease." Antibiotics and Chemotherapy, 4(3):319-329.

Finlay, W. H. et al. (Jun. 1998), "Regional lung deposition of nebulized liposome-encapsulated ciprofloxacin," International Journal of Pharmaceutics (Amsterdam), 167(1-2):121-127.
Fountain, M. W. et al. (1985), "Treatment of Brucella canis and Brucella abortus In vitro and in vivo by stable plurilamellar vesicle-encapsulated aminoolycosides," The Journal of Infectious Diseases, 152(3):529-535.
Fresenius Kabi USA, New Drug Application (NDA): 019887, NebuPent on Drugs@FDA [online], https://www.accessdata.fda.gov/scripts/cder/daf/index.cfm?event=BasicSearch.process, Retrieved on Apr. 24, 2017, 3 pages.
Furneri et al. (2000), "Ofloxacin-Loaded Liposomes: In Vitro Activity and Drug Accumulation in Bacteria," Antimicrobial Agents Chemotherapy, 44(9):2458-2464.
Gadkowski, L. B. et al. (Apr. 2008), "Cavitary Pulmonary Disease," Clinical Microbiology Reviews, vol. 21, No. 2, pp. 305-333.
Garcia, A. T. (1982), "Efficacy of amikacin sulfate in lower respiratory infections," Investigacion Medica Internacional, 9(3):235-240, with English Abstract.
Gay et al. (Jul. 1984), "In Vitro Activities of Norfloxacin and Ciprofloxacin Against *Mycobacterium tuberculosis, M. avium Complex, M. chelonei, M. fortuitum*, and *M. kansaii*," Antimicrobial Agents and Chemotherapy, vol. 26, No. 1, pp. 94-96.
Geller, D. E. et al. (2002), "Pharmacokinetics and bioavailability of aerosolized tobramycin in cystic fibrosis," Chest, 122(1):219-226.
Geller, D. E. et al. (Apr. 2010), Guidance on the Use of eFlow Nebulizers (Altera and Trio), 5 pages.
Generics [UK] Ltd.'s Notice of Opposition for European Application No. 06787716.7, filed Jun. 4, 2014, 17 pages.
Gerasimov, O. V. et al. (1999) , "Cytosolic drug delivery using pH- and light-sensitive liposomes," Advanced Drug Delivery Reviews 38 317-338.
Gibson, R. L. et al. (2003), "Significant microbiological effect of inhaled tobramycin in young children with cystic fibrosis," American Journal of Respiratory and Critical Care Medicine, 167(6):841-849.
Gibson, R. L. et al. (2003), "Pathophysiology and management of pulmonary infections in cystic fibrosis," American Journal of Respiratory and Critical Care Medicine, 168(8):918-951.
Gilbert, B. E. et al. (1997), "Tolerance of volunteers to cyclosporine A-dilauroylphosphatidylcholine liposome aerosol," American Journal of Respiratory and Critical Care Medicine, 156(6):1789-1793.
Gilead Sciences, Inc., CAYSTON (aztreonam for inhalation solution) Highlights of Prescribing Information (2014), 19 pages.
Gleiser, C. A. et al. (1963), "Pathology of experimental respiratory anthrax in Macaca mulatta," Brit. J. Exp. Path., vol. 44, pp. 416-426.
Goldman, J. M. et al. (1990), "Inhaled micronised gentamicin powder: a new delivery system," Thorax, vol. 45, pp. 939-940.
Gonzales-Rothi, R. J. et al. (1991), "Liposomes and pulmonary alveolar macrophages: functional and morphologic interactions," Experimental Lung Research, 17:687-705.
Google Scholar, Amikacin Liposome Inhalation Suspension Ethambutol Search Results, [Online search], Retrieved from the Internet: https://scholar.google.com/scholar?hl=en&as_sdt=0%2C47&q=amikacin+liposome+inhalation+suspension+ethambutol, Retrieved on Jan. 12, 2022, 3 pages.
Google Scholar, Amikacin Liposome Inhalation Suspension Search Results, [Online search], Retrieved from the Internet: https://scholar.google.com/scholar?hl=en&as_sdt=0%2C47&q=amikacin+liposome+inhalation+suspension, Retrieved on Jan. 12, 2022, 3 pages.
Goss, C. H. et al. (2004), "Update on cystic fibrosis epidemiology," Current Opinion in Pulmonary Medicine, 10(6):510-514.
Graczyk, J. et al. (1997), "Staphylococcal pneumonia—analysis of material of patients treated in lung diseases hospital in years 1981-1994," Pneumonologia I Alergologia Polska, 65(11-12):767-774, with English Abstract.
Greene, K. E. et al. (1994), "Radiographic changes in acute exacerbations of cystic fibrosis in adults: A pilot study," AJR, 163:557-562.
Griffith, D. E. et al. (2007), "An Official ATS/IDSA Statement: Diagnosis, Treatment, and Prevention of Nontuberculous Mycobacterial Diseases," Am J Respir Crit Care Med., vol. 175, pp. 367-416.

(56) References Cited

OTHER PUBLICATIONS

Griffith, D. E. et al. (Dec. 2018), "Amikacin Liposome Inhalation Suspension for Treatment-Refractory Lung Disease Caused by *Mycobacterium avium* Complex (Convert) A Prospective, Open-Label, Randomized Study," American Journal of Respiratory and Critical Care Medicine, vol. 198, Issue 12, pp. 1559-1569.
Gubernator, J. (2011), "Active methods of drug loading into liposomes: recent strategies for stable drug entrapment and increased in vivo activity," Expert Opinion in Drug Delivery, vol. 8(5):565-580.
Gunther, A. et al. (2001), "Surfactant alteration and replacement in acute respiratory distress syndrome," Respiratory Research, vol. 2, No. 6, pp. 353-364.
Gursoy et al. (1997), Characterization of ciprofloxacin liposomes; derivative ultraviolet spectrophotometric determinations. J. Microencapsulation vol. 14, No. 6, pp. 769-776.
Hagwood, S. et al. (1998), "Structure and properties of surfactant protein B," Biochimica et Biophysica Acta., 1408:150-160.
Hansen, C. R. et al. (2005), "Long-term azithromycin treatment of cystic fibrosis patients with chronic pseudomonas aeruginosa infection: an observational cohort study," Journal of Cystic Fibrosis, 4(1):35-40.
Harris, C. M. et al. (Jan. 1985), "The stabilization of vancomycin by peptidoglycan analogs," J Antibiot (Tokyo) ;38(1):51-57.
Helbich, T. et al. (1993), "High-resolution computed tomography of the lung in young patients with cystic fibrosis," Radiologe, 33(3):142-146, English Abstract.
Helguera-Repetto, A. C. et al. (May 2014), "Differential Macrophage Response to Slow- and Fast-Growing Pathogenic Mycobacteria," Hindawi Publishing Corporation, BioMed Research International, vol. 2014, Article ID 916521, 10 pages, http://dx.doi.org/10.1155/2014/916521.
Hess, D. et al. (1996), "Medication nebulizer performance. Effects of diluent vol. nebulizer flow, and nebulizer brand," Chest, 110:498-505.
Hess, D. R., (2000), "Nebulizers: Principles and Performance," Respiratory Care, 45(6):609-622.
Hewitt, W. L. et al. (1952), "Antibiotic therapy of abscess of the lung and bronchiectasis," California Medicine, 76(5):319-324.
Heyes, J. et al. (2005), "Cationic lipid saturation influences intracellular delivery of encapsulated nucleic acids," Journal of Controlled Release, 107:276-287.
Hoffman, L. R. et al. (2005), "Aminoglycoside antibiotics induce bacterial biofilm formation," Nature, 436:1171-1175.
Honeybourne, D. (1997), "Antibiotic penetration in the respiratory tract and implications for the selection of antimicrobial therapy," Current Opinion in Pulmonary Medicine, 3(2):170-174.
Howell, S. B., (2001), "Clinical applications of a novel sustained-release injectable drug delivery system: DepoFoam Technology," Cancer Journal, 7(3):219-227.
Hrkach, J. S. et al. (1995), "Synthesis of poly(L-lactic acid-co-L-lysine) graft copolymers," Macromolecules, 28:4736-4739.
Hrkach, J. S. et al. (1996), "Poly(L-Lactic acid-co-amino acid) graft copolymers: A class of functional biodegradable biomaterials," In: Hydrogels and Biodegradable Polymers for Bioapplications, Chapter 8, ACS Symposium Series No. 627, Ottenbrite, R. M. et al. (eds.), American Chemical Society, pp. 93-102.
Huang et al. (2006). Pulmonary delivery of insulin by liposomal carriers. Journal of Controlled Release 113, pp. 9-14.
Huang, L. et al. (2006), "Progress of liposome's applications in biomedicine," International Journal of Biologicals, vol. 29, No. 3, pp. 130-132 and 137, 4 pages.
Hubble, D., (1959), "Discussion on respiratory catarrh in children," Proceedings of the Royal Society of Medicine, 52(9):701-710.
Hung, J. C. et al. (Oct. 1994), "Evaluation of two commercial jet nebulisers and three compressors for the nebulisation of antibiotics," Archives of Disease in Childhood, 71(4):335-338.
Hung, O. R. et al. (Aug. 1995), "Pharmacokinetics of inhaled liposome-encapsulated fentanyl," Anesthesiology, 83(2):277-284.
Hunt, B. E. et al. (1995), "Macromolecular mechanisms of sputum inhibition of tobramycin activity," Antimicrobial Agents and Chemotherapy, 39(1):34-39.
Hyde et al. (2009), "Anatomy, pathology, and physiology of the treacheobronchial tree: Emphasis on the distal airways," J. Allergy Clin. Immunol., vol. 124, No. 6, pp. S72-S77.
Ikegami, M. et al. (1998), "Surfactant protein metabolism in vivo," Biochimica et Biophysica Acta, 1408:218-225.
Ikemoto, H. et al. (1989), "Susceptibility of bacteria isolated from the patients with lower respiratory tract infections to antibiotics," The Japanese Journal of Antibiotics, 42(11):2350-2353.
Interlocutory Decision in Opposition Proceedings (Art. 101(3)(a) and 106(2) EPC) for European Application No. 06787716.7, mailed May 10, 2022, 141 pages.
Interlocutory Decision in Opposition Proceedings (Art. 101(3)(a) and 106(2) EPC) for European Application No. 06787716.7, mailed Nov. 27, 2015, 135 pages.
International Preliminary Report on Patentability for International Application No. PCT/US2003/034240, mailed May 6, 2013, 5 pages.
International Preliminary Report on Patentability for International Application No. PCT/US2006/027859, dated Jan. 22, 2008, 6 pages.
International Preliminary Report on Patentability for International Application No. PCT/US2006/046360, dated Jun. 11, 2008, 5 pages.
International Preliminary Report on Patentability for International Application No. PCT/US2007/008404, dated Oct. 21, 2008, 4 pages.
International Preliminary Report on Patentability for International Application No. PCT/US2007/008500, dated Oct. 21, 2008, 8 pages.
International Preliminary Report on Patentability for International Application No. PCT/US2008/062469, dated Nov. 10, 2009, 7 pages.
International Preliminary Report on Patentability for International Application No. PCT/US2008/062868, dated Nov. 10, 2009, 5 pages.
International Preliminary Report on Patentability for International Application No. PCT/US2008/080954, dated Apr. 27, 2010, 6 pages.
International Preliminary Report on Patentability for International Application No. PCT/US2009/060468, dated Apr. 19, 2011, 4 pages.
International Preliminary Report on Patentability for International Application No. PCT/US2013/042113, dated Nov. 25, 2014, 9 pages.
International Preliminary Report on Patentability for International Application No. PCT/US2022/032629 dated Dec. 21, 2023, 14 pages.
International Search Report and Written Opinion for International Application No. PCT/US2006/027859, mailed Aug. 14, 2007, 8 pages.
International Search Report and Written Opinion for International Application No. PCT/US2006/046360, mailed Oct. 17, 2007, 5 pages.
International Search Report and Written Opinion for International Application No. PCT/US2007/008404, mailed Sep. 26, 2008, 6 pages.
International Search Report and Written Opinion for International Application No. PCT/US2007/008500, mailed Sep. 26, 2008, 9 pages.
International Search Report and Written Opinion for International Application No. PCT/US2008/062469, mailed Sep. 18, 2008, 9 pages.
International Search Report and Written Opinion for International Application No. PCT/US2008/062868, mailed Sep. 18, 2008, 7 pages.
International Search Report and Written Opinion for International Application No. PCT/US2008/080954, mailed on Jul. 17, 2009, 8 pages.
International Search Report and Written Opinion for International Application No. PCT/US2013/042113, mailed Sep. 4, 2013, 13 pages.

(56) References Cited

OTHER PUBLICATIONS

International Search Report and Written Opinion for International Application No. PCT/US2013/072136, mailed Feb. 12, 2014, 15 pages.
International Search Report and Written Opinion for International Application No. PCT/US2015/031079, mailed Aug. 5, 2015, 9 pages.
International Search Report and Written Opinion for International Application No. PCT/US2016/041776, mailed Sep. 16, 2016, 9 pages.
International Search Report and Written Opinion for International Application No. PCT/US2016/062894, mailed Jan. 31, 2017, 10 pages.
International Search Report and Written Opinion for International Application No. PCT/US2019/024901, mailed Jun. 12, 2019, 12 pages.
International Search Report and Written Opinion for International Application No. PCT/US2019/030404, mailed Jul. 2, 2019, 8 pages.
International Search Report and Written Opinion for International Application No. PCT/US2022/032629, mailed Nov. 4, 2022, 25 pages.
International Search Report for International Application No. PCT/US2003/034240, mailed Jul. 12, 2005, 1 page.
Ip, M. S. M. et al. (1996), "Bronchiectasis and related disorders," Respirology, 1:107-114.
Ishii, F. et al. (1995), "Procedure for Preparation of Lipid Vesicles (Liposomes) Using the Coacervation (Phase Separation) Technique," Langmuir, 11(2):483-486.
Janoff, A. S. et al. (1988), "Unusual lipid structures selectively reduce the toxicity of amphotericin B," Proc. Nat. Acad. Sci. USA, 85:6122-6126.
Jayaraman, S. et al. (2001), "Noninvasive in vivo fluorescence measurement of airway-surface liquid depth, salt concentration, and pH," J. Clin. Invest. 107:317-324.
Jeffs, L. B. et al. ( Mar. 2005), "A Scalable, Extrusion-Free Method for Efficient Liposomal Encapsulation of Plasmid DNA," Pharmaceutical Research, vol. 22, No. 3, pp. 362-372.
Jo, E-K. (2010), "Innate immunity to mycobacteria: vitamin D and autophagy," Cellular Microbiology 12(8):1026-1035, doi: 10.1111/j.1462-5822.2010.01491.x, First published online Jun. 15, 2010.
Johansson, J. (1998), "Structure and properties of surfactant protein C," Biochimica et Biophysica Acta, 1408:161-172.
Johnson, M. M. et al. (Mar. 2014), "Nontuberculous mycobacterial pulmonary infections," Journal of Thoracic Disease, vol. 6, No. 3, pp. 210-220.
Johnston, M. J. W. et al. (2006), "Therapeutically optimized rates of drug release can be achieved by varying the drug-to-lipid ratio in liposomal vincristine formulations," Biochimica et Biophysica Acta, vol. 1758, pp. 55-64.
Jones, M. N. (2005), "Use of Liposomes to Deliver Bactericides to Bacterial Biofilms," Methods of Enzymology, vol. 391, pp. 211-228.
Kadry, A. A. et al. (2004), "Treatment of experimental osteomyelitis by liposomal antibiotics," Journal of Antimicrobial Chemotherapy, 54(6):1103-1108.
Katare, O. P. et al. (1995), "Enhanced in vivo Performance of Liposomal Indomethacin Derived From Effervescent Granule Based Proliposomes," J. Microencapsulation, 12(5):487-493.
Kensil et al. (1981), "Alkaline Hydrolysis of Phospholipids in Model Membranes and the Dependence on Their State of Aggregation," Biochemistry, vol. 20, pp. 6079-6085.
Kesavalu, L. et al. (1990), "Differential effects of free and liposome encapsulated amikacin on the survival of *Mycobacterium avium* complex in mouse peritoneal macrophages," Tubercle, 71(3):215-217.
Kim, E. K. et al. (1990), "Pharmacokinetics of intravitreally injected liposomes encapsulated tobramycin in normal rabbits," Yonsei Medical Journal, 31(4):308-314.
Klein, S. (Nov. 2006), "The Mini Paddle Apparatus-a Useful Tool in the Early Developmental Stage?," Experiences with Immediate-Release Dosage Forms. Dissolution Technologies. Nov. 2006 [online]. [Retrieved on Sep. 9, 2022). Retrieved from the internet: http://dissolutiontech.com/Dtresour/200611Articles/DT200611_A01.pdf, 6 pages.
Klemens, S. P. et al. (1990), "Liposome-encapsulated-gentamicin therapy of *Mycobacterium avium* complex infection in beige mice," Antimicrobial Agents and Chemotherapy, 34(6):967-970.
Knoch, M. et al. (2005), "The customised electronic nebuliser: a new category of liquid aerosol drug delivery systems," Expert Opin. Drug Deliv., 2(2):377-390.
Knox, K. et al. (1955), "Chronic bronchitis. An attempt to control chronic infection with Haemophilus influenzae by aerosol therapy," The Lancet, pp. 120-122.
Kozarov, E. (Jan. 2012), "Bacterial invasion of vascular cell types: vascular infectologyand atherogenesis," Future Cardiol; 8(1):123-138. doi:10.2217/fca.11.75.
Kyriacos et al. (2009) "In Vitro Testing of Ciprofloxacin Formulations and Preliminary Study on BCS Biowaiver," Journal of Food and Drug Analysis, 17(2):78-84.
Labiris, N. R. et al. (2003), "Pulmonary drug delivery. Part II: The role of inhalant delivery devices and drug formulations in Therapeutic effectiveness of aerosolized medications," Br.J.Clin. Pharmacol., 56(6):600-612.
Lagace, J. et al. (1991), "Liposome-encapsulated antibiotics: preparation, drug release and antimicrobial activity against Pseudomona aeruginosa," Journal Microencapsulation, 8(1):53-61.
Landyshev, Y. S. et al. (2002), "Clinical and experimental aspects of liposomal hydrocortisone treatment of bronchial asthma," Ter. Arkh., 74(8):45-48, with English Abstract.
Lasic, D. D. (Nov. 1992), "Gelation of liposome interior: A novel method for drug encapsulation," FEBS Letters, 312(2.3):255-258.
Lasic et al. (1995), "Transmembrane gradient driven phase transitions within vesicles: lessons for drug delivery," Biochemica et Biophysica Acta, 1239:145-156.
Lass, J. S. et al. (2006), "New advances in aerosolised drug delivery: vibrating membrane nebuliser technology," Expert Opin Drug Deliv., 3(5):693-702.
Le Brun, P. P. H. et al. (1999), "Inhalation of tobramycin in cystic fibrosis part 1: The choice of a nebulizer," International Journal of Pharmaceutics, 189:205-214.
Le Brun, P. P. H. et al. (1999), "Inhalation of tobramycin in cystic fibrosis part 2: Optimization of the tobramycin solution for a jet and ultrasonic nebulizer," International Journal of Pharmaceutics, 189:215-225.
Le Brun, P. P. H. et al. (2000), "A review of the technical aspects of drug nebulization," Pharmacy World & Science, 22(3):75-81.
Le Brun, P. P. H. et al. (2002), "Dry powder inhalation of antibiotics in cystic fibrosis therapy: part 2. Inhalation of a novel colistin dry powder formulation: a feasibility study in healthy volunteers and patients," European Journal of Pharmaceutics and Biopharmaceutics, 54:25-32.
Leite, E. A. et al. (2012), "Encapsulation of cisplatin in long-circulating and pH-sensitive liposomes improves its antitumor effect and reduces acute toxicity," International Journal of Nanomedicine, vol. 7, pp. 5259-5269.
Levin, A. M. et al. (2013), "Association of ANXA11 genetic variation with sarcoidosis in African Americans and European Americans," Genes and Immunity, vol. 14, No. 1, pp. 13-18.
Levy, D. E. et al. (Jul. 2010), "PEGylated iminodiacetic acid zinc complex stabilizes cationic RNA-bearing nanoparticles," Bioorganic & Medicinal Chemistry Letters, 20:5499-5501.
Li, Q. et al. (Apr. 2016), "Micellar delivery of dasatinib for the inhibition of pathologic cellular processes of the retinal pigment epithelium," Colloids and Surfaces B: Biointerfaces, vol. 140, pp. 278-286.
Li, Z. et al. (2006), "Nebulization of liposomal amikacin formulations: SLIT Amikacin," Respiratory Drug Delivery, 3:801-804.
Li, Z. et al. (2008), "Characterization of nebulized liposomal amikacin (Arikace) as a function of droplet size," Journal of Aerosol Medicine and Pulmonary Drug Delivery, 21(3):245-253.
Lin, H.-C. et al. (1997), "Inhaled gentamicin reduces airway neutrophil activity and mucus secretion in bronchiectasis," Am. J. Respir. Crit. Care Med., 155:2024-2029.

(56) References Cited

OTHER PUBLICATIONS

Lipuma, J. J. (Sep. 2001), "Microbiological and immunologic considerations with aerosolized drug delivery," Chest ;120(3 Suppl):118S-123S.

Lowry et al. (1988), "Effects of pH and osmolarity on aerosol-induced cough in normal volunteers," Clinical Science, 74:373-376.

Lutwyche, P. et al. (Oct. 1998), "Intracellular delivery and antibacterial activity of gentamicin encapsulated in pH-sensitive liposomes," Antimicrobial Agents and Chemotherapy, 42(10):2511-2520.

Magallanes, M. et al. (Nov. 1993), "Liposome-incorporated ciprofloxacin in treatment of murine salmonellosis," Antimicrobial Agents and Chemotherapy, 37(11):2293-2297.

Maiz, L. et al. (1998), "Aerosolized vancomycin for the treatment of methicillin-resistant *Staphylococcus aureus* infection in cystic fibrosis," Pediatric Pulmonology, 26(4):287-289.

Majumdar, S. et al. (Dec. 1992), "Efficacies of Liposome-Encapsulated Streptomycin and Ciprofloxacin against *Mycobacterium avium-M. intracellulare* Complex Infections in Human Peripheral Blood Monocyte/Macrophages," Antimicrobial Agents and Chemotherapy, 36(12):2808-2815.

Marcotte, G. V. et al. (1997), "Chronic productive cough and bronchiectasis in a 40-year-old woman," Annals of Allergy, Asthma & Immunology, 78(6):559-564.

Marier, J. F. et al. (2003), "Liposomal tobramycin against pulmonary infections of Pseudomonas aeruginosa: a pharmacokinetic and efficacy study following single and multiple intratracheal administrations in rats," Journal Antimicrobial Chemotherapy, 52:247-252.

Marier, J-F. et al. (2002), "Pharmacokinetics and efficacies of liposomal and conventional formulations of tobramycin after intratracheal administration in rats with pulmonary burkholderia cepacia infection," Antimicrobial Agents and Chemotherapy, 46(12):3776-3781.

Mariotti, A. B. et al. (1996), "Aerosol therapy with tobramycin in exacerbations of chronic obstructive lung disease (7 cases)," 66(2):198-202, with English Abstract.

Martin, D. W. et al. (Jan. 2000), "Invasion and Intracellular Survival of Burkholderia cepacia," Infection and Immunity, vol. 68, No. 1, pp. 24-29.

Martini, W. Z. et al. (1999), "Lung surfactant kinetics in conscious pigs," Am J Physiol., 277(1 Pt 1): E187-E195.

Marwah, O. S. et al. (Feb. 1995), "Bronchiectasis. How to identify, treat and prevent," Postgrad. Med., 97(2):149-150, 153-156, 159 (Abstract), 1 page.

Maurer, N. et al. (1998), "Anomalous solubility behavior of the antibiotic ciprofloxacin encapsulated in liposomes: a 1H-NMR study," Biochimica et Biophysica Acta, 1374:9-20.

McAllister, S. M. et al. (1999), "Antimicrobial properties of liposomal polymyxin B," Journal of Antimicrobial Chemotherapy, 43:203-210.

Meers, P. et al. (2008), "Biofilm penetration, triggered release and in vivo activity of inhaled liposomal amikacin in chronic Pseudomonas aeruginosa lung infections," Journal of Antimicrobial Chemotherapy, 61(4):859-868.

Mendelman, P. M. et al. (1985), "Aminoglycoside penetration, inactivation, and efficacy in cystic fibrosis sputum," American Review of Respiratory Disease, 132(4):761-765.

Mercer, R. R. et al. ( 1994), "Cell Number and Distribution in Human and Rat Airways," Am. J. Respir. Cell Mol. Biol., vol. 10, pp. 613-624.

Minic, P. ( Dec. 2010), "A multi-cycle open label study of nebulized liposomal amikacin (Arikace) in the treatment of cystic fibrosis patients with chronic pseudomonas aeruginosa lung infection," Pediatric Pulmonology, vol. 45, Issue S33, Special Issue: The 24th Annual North American Cystic Fibrosis Conference, Baltimore Convention Center, Baltimore, Maryland, Oct. 21-23, 2010, p. 306, 4 pages.

Mohanty, B. et al. (2003), "Systematic of alcohol-induced simple coacervation in aqueous gelatin solutions," Biomacromolecules, vol. 4, pp. 1080-1086.

Mombelli, G. et al. (1981), "Anti-pseudomonas activity in bronchial secretions of patients receiving amikacin or tobramycin as a continuous infusion," Antimicrobial Agents and Chemotherapy, 19(1):72-75.

Montero et al. (1998), "Fluoroquinolone-biomembrane interactions: monolayer and calorimetric studies." Langmuir, vol. 14, No. 9, pp. 2451-2454.

Morgan, J. R. et al. (1980), "Preparation and properties of liposome-associated gentamicin," Antimicrobial Agents and Chemotherapy, 17(4):544-548.

Moss, R. B. (Sep. 2001), "Administration of aerosolized antibiotics in cystic fibrosis patients," Chest, 120(3 Suppl):107S-113S.

Mrazek, F. et al. (2011), "Functional variant ANXA11 R230C: true marker of protection and candidate disease modifier in sarcoidosis," Genes and Immunity, vol. 12, No. 6, pp. 490-494.

Myers, M. A. et al. (1993), "Pulmonary effects of chronic exposure to liposome aerosols in mice," Experimental Lung Research, vol. 19, pp. 1-19.

Nahire, R. et al. (2014), "pH-Triggered Echogenicity and Contents Release from Liposomes," Mol. Pharmaceutics, vol. 11, pp. 4059-4068.

Nakano, K. et al. (Sep. 2006), "Detection of Cariogenic *Streptococcus mutans* in Extirpated Heart Valve and Atheromatous Plaque Specimens," Journal of Clinical Microbiology, vol. 44, No. 9, pp. 3313-3317.

Nakazawa, S. et al. (1974), "Studies on a new aminoglycoside antibiotic, amikacin (BB-K8) in pediatrics," The Japanese Journal of Antibiotics, 27(4):438-445.

Nasu, M. et al. (2003), "Appropriate use of antimicrobial agents," Selection of Anti-infective, Clinic in Japan (Special Number) Infection Disease Study in New Era (first volume), 61st issue, pp. 718-723.

National Jewish Health, (Jun. 2007), "Third sputum smear test negative for XDR TB patient Andrew Speaker," [Online], Retrieved from the Internet: URL: https://www.nationaljewish.org/about/news/press-releases/2007/smear-test-3, 2 pages.

New, R. R. C. (1990), "Chapter 2: Preparation of Liposomes," In: Liposomes: A Practical Approach, IRL Press at Oxford University Press, pp. 33-104.

Newton, D. W. et al. (1991), Chapter 4: "Coacervation: Principles and Applications," In: Polymers for Controlled Drug Delivery, Tarcha, P. J. (ed.), CRC Press, Boca Raton, pp. 67-81.

Nightingale, S. D. et al. (1993), "Liposome-encapsulated gentamicin treatment of *Mycobacterium avium-Mycobacterium intracellulare* complex bacteremia in AIDS patients," Antimicrobial Agents and Chemotherapy, 37(9):1869-1872.

Nikolaizik et al. (Jul./Aug. 2008) "A pilot study to compare tobramycin 80 mg injectable preparation with 300 mg solution for inhalation in cystic fibrosis patients," Canadian Respiratory Journal, 15(5):259-262.

Niu, J. et al. (2009), "Role of MCP-I in cardiovascular disease: molecular mechanisms and clinical implications," Clinical Science, vol. 117, pp. 95-109. doi:10.1042/CS20080581.

Niven, R. W. et al. (1991), "Nebulization of liposomes. II. The effects of size and modeling of solute release profiles," Pharmaceutical Research, 8(2):217-221.

Niven, R. W. et al. (1992), "Nebulization of liposomes. III. The effects of operating conditions and local environment," Pharmaceutical Research, 9(4):515-520.

Niven, R. W. et al. (Nov. 1990), "Nebulization of liposomes. I. Effects of lipid composition," Pharmaceutical Research, 7(11):1127-1133.

Novartis Pharmaceuticals Corporation, TOBI, Tobramycin Inhalation Solution, USP, Nebulizer Solution, Prescribing Information, Oct. 2015, 14 pages.

Novosad, S. et al. (Sep. 2015), "The Challenge of Pulmonary Nontuberculous Mycobacterial Infection," Curr Pulmonol Rep; 4(3):152-161. doi:10.1007/s13665-015-0119-3.

Oh, Y-K et al. (Sep. 1995), "Formulation and Efficacy of Liposome-Encapsulated Antibiotics for Therapy of Intracellular Mycobacterium avium Infection," Antimicrobial Agents and Chemotherapy, 39(9):2104-2111.

(56) References Cited

OTHER PUBLICATIONS

Oizumi, K. et al. (1978), "Therapeutic effect of amikacin for infections with gram-negative bacilli, especially for stubborn respiratory infections," The Japanese Journal of Antibiotics, 31(1):15-23.
Olivier, K. N. et al. (Jan. 2014), "Inhaled amikacin for treatment of refractory pulmonary nontuberculous mycobacterial disease," Ann. Am. Thorac. Soc., vol. 11, No. 1, pp. 30-35.
Olivier, K. N. et al. (Mar. 2017), "Randomized Trial of Liposomal Amikacin for Inhalation in Nontuberculous Mycobacterial Lung Disease", American Journal of Respiratory and Critical Care Medicine, vol. 195, Issue 6, pp. 814-823, with supplemental data.
Olsen, A. M. (1946), "Nebulization therapy in bronchiectasis: The use of penicillin and streptomycin aerosols," In: Collected Papers of the Mayo Clinic and the Mayo Foundation, Hewitt, R. M. et al. (eds.), 38:579-586.
Olsen, A. M. (1947), "Nebulization therapy in bronchiectasis: The use of penicillin and streptomycin aerosols," J.A.M.A., 134(11):947-953.
Olsen, A. M. (1996), "Streptomycin aerosol in the treatment of chronic bronchiectasis: preliminary report," Staff Meetings of the Mayo Clinic, pp. 53-54.
Omri, A. et al. (1994), "Pulmonary retention of free and liposome-encapsulated tobramycin after intratracheal administration in uninfected rats and rats infected with Pseudomonas aeruginosa," Antimicrobial Agents and Chemotherapy, 38(5):1090-1095.
Omri, A. et al. (1995), "Incorporation, release and in-vitro antibacterial activity of liposomal aminoglycosides against Pseudomonas aeruginosa," Journal Antimicrobial Chemotherapy, 36(4):631-639.
Omri, A. et al. (1996), "Comparison of the bactericidal action of amikacin, netilmicin and tobramtcin in free and liposomal formulation against pseudomonas aeruginosa," Chemotherapy, 42:170-176.
Onyeji, C. O. et al. (1994), "Enhanced killing of methicillin-resistant *Staphylococcus aureus* in human macrophages by liposome-entrapped vancomycin and teicoplanin," Infection, 22(5):338-342.
Oswald-Richter, K. A. et al. (2010), "Multiple mycobacterial antigens are targets of the adaptive immune response in pulmonary sarcoidosis," Respiratory Research, 11:161, 11 pages.
Pai, V. B. et al. (2001), "Efficacy and safety of aerosolized tobramycin in cystic fibrosis," Pediatric Pulmonology, 32(4):314-327.
Papahadjopoulos, D. et al. (1967), "Phospholipid model membranes. I. Structural characteristics of hydrated liquid crystals," Biochimica et Biophysica Acta., 135:624-638.
Paradisi, F. et al., (1978), "Acute and chronic bronchopulmonary infections and aminoglycoside antibiotics," Chemioterapia Antimicrobica, 1(2):224-227.
Parsek, M. R. et al. (2000), "Acyl-homoserine lactone quorum sensing gram-negative bacteria: a signaling mechanism involved in associations with higher organisms," Proc. Nat. Acad. Sci., 97(16):6789-6793.
Patentee's Response to Notice of Opposition and Declaration of Lee Leserman for European Application No. 06787716.7, filed Jan. 16, 2015, 58 pages.
Patton, J. S. et al. (2004), "The lungs as a portal of entry for systemic drug delivery," Proc. Am. Thor. Soc., 1:338-344.
Perkins, W. R. et al. (Jul. 1996), "Role of lipid polymorphism in pulmonary surfactant," Science, 273:330-332.
Perkins, W. R. et al. (Oct. 2007), "Aerosolization of liposomal amikacin (Arikace) using different nebulizers: Selection of the eflow nebulizer," Poster and Oral Presentation at North American Cystic Fibrosis Conference, Pediatric Pulmonology, 42(30):356-357, Abstract 434, 14 pages.
Petersen, E. A. et al. (1996), "Liposomal amikacin: improved treatment of *Mycibacterium avium* complex infection in the beige mouse model," Journal Antimicrobial Chemotherapy, vol. 38, pp. 819-828.
Petkowicz, J. et al. (1989), "Hypoglycemic Effect of Liposome-Entrapped Insulin Administered by Various Routes into Normal Rats," Pol. J. Pharmacol. Pharm., 41:299-304.

Pierce, E. S. (Mar. 2009), "Where Are All the *Mycobacterium avium* Subspeciesparatuberculosis in Patients with Crohn's Disease?," PLoS Pathogens 5(3):e1000234. doi:10.1371/journal.ppat.1000234, 11 pages.
Piersimoni et al. (2008), "Pulmonary infections associated with non-tuberculous mycobacteria in immunocompetent patients," Lancet Infect Dis, vol. 8, pp. 323-334.
Pilewski, J. M. et al. (1999), "Role of CFTR in airway disease," Physiological Reviews, 79(1):S215-S255.
Pines, A. et al. (1967), "Gentamicin and colistin in chronic purulent bronchial infections," British Medical Journal, 2:543-545.
Pines, A. et al. (1970), "Treatment of severe pseudomonas infections of the bronchi," British Medical Journal, vol. 1, pp. 663-665.
Pollock, S. et al. (2010), "Uptake and trafficking of liposomes to the endoplasmicreticulum," FASEB J., vol. 24, pp. 1866-1878.
Potter, B. P. (Apr. 1949), "Aerosol antibiotic therapy in suppurative diseases of the lung and bronchi," Diseases of the Chest, 15(4):436-448.
Poyner, E. A. et al. (1993), "Preparation, properties and the effects of free and liposomal tobramycin on siderophore production by Pseudomonas aeruginosa," Journal of Antimicrobial Chemotherapy, 34:43-52.
Poyner, E. A. et al. (1995), "A comparative study on the pulmonary delivery of tobramycin encapsulated into liposomes and PLA microspheres following intravenous and endotracheal delivery," Journal of Controlled Release, 35(1):41-48.
Presant, C. A. et al. (1993), "Chapter 18: Design of Liposome Clinical Trials," In: Liposome Technology, Entrapment of Drugs and Other Materials, Gregoriadis, G. (ed.), vol. II, 2nd Edition, CRC Press, Inc., pp. 307-317.
Press Release, "Transave Announces Positive Phase II Results for Once-Daily Arikace in the Treatment of Cystic Fibrosis Patients Who Have Pseudomonas Lung Infections," Presented at the European Cystic Fibrosis Society Conference, Monmouth Junction, NJ, Jun. 13, 2008, 3 pages.
Price, C. I. et al. (1989), "Enhanced effectiveness of intraperitoneal antibiotics administered via liposomal carrier," Arch Surgery, 124:1411-1415.
Price, C. I. et al. (1994), "Liposome encapsulation: a method for enhancing the effectiveness of local antibiotics," Surgery, 115(4):480-487.
Price, C. I. et al. (May 1992), "Liposome delivery of aminoglycosides in burn wounds," Surgery, Gynecology & Obstetrics, 174(5):414-418.
Price, K. E. et al. (1976), "Amikacin, an aminoglycoside with marked activity against antibiotic-resistant clinical isolates," The Journal of Infectious Diseases, 134:S249-S261.
Prosecution history for U.S. Pat. No. 9,402,845, issued Aug. 2, 2016 (excerpted), 430 pages.
Pujol, C. et al. (Jun. 2009), "Yersinia pestis Can Reside in Autophagosomes and Avoid Xenophagy in Murine Macrophages by Preventing Vacuole Acidification," Infection and Immunity, vol. 77, No. 6, pp. 2251-2261.
Rahman, S. A. et al. (Nov./Dec. 2014), "Comparative Analyses of Nonpathogenic, Opportunistic, and Totally Pathogenic Mycobacteria Reveal Genomic and Biochemical Variabilities and Highlight the Survival Attributes of *Mycobacterium tuberculosis*," mBio, 5(6):e02020-14. doi: 10.1128/mBio.02020, 9 pages.
Ramsammy, L. S. et al. (1988), "The effect of gentamicin on the biophysical properties of phosphatidic acid liposomes is influenced by the O-C=O group of the lipid," Biochemistry, 27:8249-8254.
Ramsey, B. W. et al. (1993), "Efficacy of aerosolized tobramycin in patients with cystic fibrosis," The New England Journal of Medicine, 328:1740-1746.
Ramsey, B. W. et al. (1999), "Intermittent administration of inhaled tobramycin in patients with cystic fibrosis. Cystic Fibrosis Inhaled Tobramycin Study Group," The New England Journal of Medicine, 340(1):23-30.
Rastogi et al. (2006). Particulate and vesicular drug carriers in the management of tuberculosis. Current Drug Delivery 3(1), pp. 121-128.

(56) References Cited

OTHER PUBLICATIONS

Rau, J. L. et al. (2004), "Performance Comparison of Nebulizer Designs: Constant-Output, Breath-Enhanced, and Dosimetric," Respir. Care;49(2):174-179.
Repligen (2021), "Float-A-Lyzer@ Dialysis Device User Guide," [Online]. [Retrieved on Oct. 12, 2022]. Retrieved from the internet: https://www.repligen.com/application/files/8016/1851/4608/420-10732-000rev11.pdf, 7 pages.
Roehrborn, A. A. et al. (1995), "Lipid-based slow-release formulation of amikacin sulfate reduces foreign body-associated infections in mice," Antimicrobial Agents and Chemotherapy, 39(8):1752-1755.
Rose, S. J. et al. (Sep. 2014), "Delivery of Aerosolized Liposomal Amikacin as a Novel Approach for the Treatment of Nontuberculous Mycobacteria in an Experimental Model of Pulmonary Infection," PLoS ONE 9(9): e108703. doi:10.1371/journal.pone.0108703, 7 pages.
Ross et al. (1990), "Aqueous solubilities of some variously substituted quinolone antimicrobials," International Journal of Pharmaceutics, 63(3): 237-250.
Sabra, W. et al. (2002), "Physiological responses of pseudomonas aeruginosa PAO1 to oxidative stress in controlled microaerobic and aerobic cultures," Microbiology, 148:3195-3202.
Saiman et al. (Sep. 1996), "Antibiotic Susceptibility of Multiply Resistant Pseudomonas aeruginosa Isolated from Patients with Cystic Fibrosis, Including Candidates for Transplantation," Clinical Infectious Diseases, 23:532-537.
Samoshina, N. M. et al. (2011), "Fliposomes: pH-Sensitive Liposomes Containing a trans-2-morpholinocyclohexanol-Based Lipid That Performs aConformational Flip and Triggers an Instant Cargo Release in Acidic Medium," Pharmaceutics, vol. 3, pp. 379-405. doi:10.3390/pharmaceutics3030379.
Sanderson, N. M. et al. (1996), "Encapsulation of vancomycin and gentamicin within cationic liposomes for inhibition of growth of *Staphylococcus Epidermidis*," Journal of Drug Targeting, 4(3):181-189.
Sangwan et al. (2001), "Aerosolized Protein Delivery in Asthma: Gamma Camera Analysis of Regional Deposition and Perfusion," Journal of Aerosol Medicine, vol. 14, No. 2, pp. 185-195.
Savage, P. B. et al. (2002), "Antibacterial properties of cationic steroid antibiotics," FEMS Microbiology Letters, vol. 217, pp. 1-7.
Schaad, U. B. et al. (Oct. 1987), "Efficacy of inhaled amikacin as adjunct to intravenous combination therapy (ceftazidime and amikacin) in cystic fibrosis," Journal of Pediatrics, 111(4):599-605.
Schentag, J. J. (1999), Antimicrobial action and pharmacokinetics/pharmacodynamics: the use of AUIC to improve efficacy and avoid resistance, Journal of Chemotherapy, 11(6):426-439.
Schiffelers, R. et al. (2001), "Liposome-encapsulated aminoglycosides in pre-clinical and clinical studies," Journal of Antimicrobial Chemotherapy, 48:333-344.
Schiffelers, R. M. et al. (2001), "In vivo synergistic interaction of liposome-coencapsulated gentamicin and ceftazidime," Journal Pharmacology Experimental Therapeutics, vol. 298, No. 1, pp. 369-375.
Schiffelers, R. M. et al. (2001), "Therapeutic efficacy of liposomal gentamicin in clinically relevant rat models," International Journal of Pharmaceutics, 214:103-105.
Schlegel, L. et al. (1997), "In-vitro killing activity of combinations of beta-lactam agents with aminoglycosides against penicillin-resistant pneumococci," The Journal of Antimicrobial Chemotherapy, 39(1):95-98.
Schreier, H. et al. (1992), "Pulmonary delivery of amikacin liposomes and acute liposome toxicity in the sheep," International Journal of Pharmaceutics, 87(1-3):183-193.
Schreier, H. et al. (1993), "Pulmonary delivery of liposomes," Journal of Controlled Release, 24(1):209-223.
Sermet-Gaudelus, I. et al. (2002), "Nebulized antibiotics in cystic fibrosis," Pediatric Drugs, 4(7):455-467.
Sezer et al. (2004), "Encapsulation of Enrofloxacin in Liposomes I: Preparation and In Vitro Characterization of LUV," Journal of Liposome Research, 14(1-2):77-86.
Shah, S. P. et al. (2004), "Liposomal amikacin dry powder inhaler: effect of fines on in vitro performance," AAPS PharmSciTech, 5(4):e65:1-7.
Shek, P. N. et al. (1994), "Liposomes in Pulmonary Applications: Physiochemical Considerations, Pulmonary Distribution and Antioxidant Delivery," Journal of Drug Targeting, vol. 2, No. 5, pp. 431-442.
Shima, K. et al. (1975), "A study of amikacin (BB-K8) on the clinical effects on the respiratory infection," Chemotherapy, 23(6):2128-2130, with English Abstract.
Simoes, S. et al. (2004), "On the formulation of pH-sensitive liposomes with long circulation times," Advanced Drug Delivery Reviews, vol. 56, pp. 947-965.
Singh, P. K. et al. (2000), "Quorum-sensing signals indicate that cystic fibrosis lungs are infected with bacterial biofilms," Nature, 407:762-764.
Skubitz, K. M. et al. (2000), "Inhalational interleukin-2 liposomes for pulmonary metastases: a phase I clinical trial," Anti-Cancer Drugs, 11(7): 555-563.
Smith, A. L. et al. (1989), "Safety of aerosol tobramycin administration for 3 months to patients with cystic fibrosis," Pediatric Pulmonology, 7(4):265-271.
Smith, M. J. et al. (Oct. 1986), "Pharmacokinetics and sputum penetration of ciprofloxacin in patients with cystic fibrosis," Antimicrobial Agents and Chemotherapy, vol. 30, No. 4, pp. 614-616.
Stark, B. (2010), "Long-term stability of sterically stabilized liposomes by freezing and freeze-drying: Effects of cryoprotectants on structure," Eur. J. Pharm. Sci. 41:546-555.
Stott, P. W. et al. (1996), "Characterization of complex coacervates of some tricyclic antidepressants and evaluation of their potential for enhancing transdermal flux," Journal of Controlled Release, 41(3):215-227.
Strauss, G. (1986), "Stabilization of lipid bilayer by sucrose during freezing," PNAS 83:2422-2426.
Sudimack, J. J. et al. (2002), "A novel pH-sensitive liposome formulation containing oleyl alcohol," Biochimica et Biophysica Acta, 1564, pp. 31-37.
Sunamoto et al. (1989), "Improved drug delivery directed to specific tissue using polysaccharide-coated liposomes," Multiphase Biomedical Materials, pp. 167-190 (T. Tsuruta et al. eds.).
Sunamoto et al. (1984), "Unexpected Tissue Distribution of Liposomes Coated With Amylopectin Derivatives and Successful Use in the Treatment of Experimental Legionnaires' Diseases," Receptor-Mediated Targeting of Drugs, vol. 82, pp. 359-371 (G. Gregoriadis et al. eds.).
Suppiah, R. et al. (2011), "A cross-sectional study of the Birmingham Vasculitis Activity Score version 3 in systemic vasculitis," Rheumatology, vol. 50, pp. 899-905.
Sweeney et al. (2005). Spray-freeze-dried liposomal ciprofloxacin powder for inhaled aerosol drug delivery. International Journal of Pharmaceutics, vol. 305, pp. 180-185.
Swenson, C. E. et al. (1991), "Liposomal aminoglycosides and TLC G-65," Aids Patient Care, pp. 290-296.
Swenson, K. A. et al. (1990), "Pharmacokinetics and in vivo activity of liposome-encapsulated gentamicin," Antimicrobial Agents and Chemotherapy, 34(2)235-240.
Szoka et al. (Sep. 1978), "Procedure for preparation of liposomes with large internal aqueous space and high capture by reverse-phase evaporation," Proc. Natl Acad. Sci. USA 75:4194-4198.
Szoka, F. Jr. et al. (1980), "Comparative properties and methods of preparation of lipid vesicles (liposomes)," Ann. Rev. Biophys. Bioeng., vol. 9, pp. 467-508.
Takamoto, M. et al. (1994), "Imipenem/cilastatin sodium alone or combined with amikacin sulfate in respiratory infections," The Japanese Journal of Antibiotics, 47(9):1131-1144, with English Abstract.
Takeuchi, Y. et al. (Jan. 1989), "Stabilizing effects of some amino acids on membranes of rabbit erythrocytes perturbed by chlorpromazine," J Pharm Sci.78(1):3-7.
Tarran, R. (2004), "Regulation of Airway Surface Liquid Volume and Mucus Transport by Active Ion Transport," Proc. Am. Thorac. Soc., vol. 1, pp. 42-46.

(56) References Cited

OTHER PUBLICATIONS

Tateda, K. et al. (1999), "Efficacy of beta-lactam antibiotics combined with gentamicin against penicillin-resistant pneumococcal pneumonia in CBA/J mice," The Journal of Antimicrobial Chemotherapy, 43(3):367-371.
Taylor, K. M. G. et al. (1989), "The influence of liposomal encapsulation on sodium cromoglycate pharmacokinetics in man," Pharmaceutical Research, 6(7):633-636.
Ten, R. M. et al. (2002), "Interleukin-2 liposomes for primary immune deficiency using the aerosol route," International Immunopharmacology, 2(2-3):333-344.
Terzano, C. et al. (1998), "Tobramycin aerosol: could the delivery system influence the particle size and deposition in the lower airways?" Recenti. Prog. Med., 89(5):245-249, English Abstract.
The Asthma Center Education and Research Fund, Nebulizer Instructions [online], http://www.theasthmacenter.org/index.php/disease_information/asthma/using_special_devices/nebulizer_instructions/. Retrieved on Apr. 14, 2017, 1 page.
Thomas, D. A. et al. (1991), "Acute effects of liposome aerosol inhalation on pulmonary function in healthy human volunteers," Chest, 99(5):1268-1270.
Thomasin, C. et al. (1998), "Drug microencapsulation by PLA/PLGA coacervation in the light of thermodynamics. 2. Parameters determining microsphere formation," Journal of Pharmaceutical Sciences, 87(3):269-275.
Trafny, E. A. et al. (1995), "Effects of free and liposome-encapsulated antibiotics on adherence of Pseudomonas aeruginosa to collagen type I," Antimicrobial Agents and Chemotherapy, 39(12):2645-2649.
Ulrich, A. S. (Apr. 2002), "Biophysical aspects of using liposomes as delivery vehicles," Bioscience Reports, 22(2):129-150.
United States Patent and Trademark Office, Before the Patent Trial and Appeal Board, *Aradigm Corporation* v. *Insmed Incorporated*, Case PGR2017-00021; U.S. Pat. No. 9,402,845, Declaration of A. Bruce Montgomery, M.D. dated May 1, 2017, Aradigm Exhibit 1020, 146 pages.
United States Patent and Trademark Office, Before the Patent Trial and Appeal Board, *Aradigm Corporation* v. *Insmed Incorporated*, Case PGR2017-00021; U.S. Pat. No. 9,402,845, Declaration of Robert J. Lee, Ph.D. in Support of Patent Owner Insmed's Preliminary Response, dated Aug. 16, 2017, 92 pages.
United States Patent and Trademark Office, Before the Patent Trial and Appeal Board, *Aradigm Corporation* v. *Insmed Incorporated*, Case PGR2017-00021; U.S. Pat. No. 9,402,845, Patent Owner's Preliminary Response, filed Aug. 16, 2017, 84 pages.
United States Patent and Trademark Office, Before the Patent Trial and Appeal Board, *Aradigm Corporation* v. *Insmed Incorporated*, Case PGR2017-00021; U.S. Pat. No. 9,402,845, Petition for Post Grant Review, filed May 1, 2017, 111 pages.
U.S. Department of Health and Human Services, "Nonclinical Safety Evaluation of Reformulated Drug Products and Products Intended for Administration by an Alternate Route, Guidance for Industry and Review Staff, Good Review Practice," Oct. 2015, 12 pages.
U.S. Appl. No. 60/748,468, filed Dec. 8, 2005, entitled "Lipid-based compositions of antiinfectives for treating pulmonary infections and methods of use," 26 pages.
Van Der Straeten, M. et al. (1976), "Amikacin in the treatment of gram-negative bronchopulmonary infections," The Journal of Infectious Diseases, 134:S391-S393.
Van Heeckeren, A. et al. (Jan. 2000), "Effect of Pseudomonas infection on weight loss, lung mechanics, and cytokines in mice," Am J Respir Crit Care Med. 161(1):271, 9 pages.
Van Heeckeren, A. et al. (Jul. 2002), "Murine models of chronic Pseudomonas aeruginosa lung infection," Lab Anim., 36(3):291-312.
Van Heeckeren, A. M. et al. (Nov. 2004), "Role of CFTR genotype in the response to chronic Pseudomonas aeruginosa lung infection in mice," Am J Physiol Lung Cell Mol Physiol., vol. 287, No. 5, p. 944-L952, 9 pages.
Van Heeckeren, A. et al. (Mar. 1998), "Effects of bronchopulmonary inflammation induced by Pseudomonas aeruginosa on adenovirus-mediated gene transfer to airway epithelial cells in mice," Gene Ther., 5(3):345-351.
Van Heeckeren, A. M. et al. (Apr. 2004), "Delivery of CFTR by adenoviral vector to cystic fibrosis mouse lung in a model of chronic Pseudomonas aeruginosa lung infection," Am J Physiol Lung Cell Mol Physiol., vol. 286, No. 4, pp. L717-L726, 10 pages.
Vancomycin (Systemic), (Jun. 1999), VA Classification Primary: AM900, Drugs.com [online], Retrieved from the Internet on Apr. 7, 2011: URL: http://www.drugs.com/mmx/vancomycin-hydrochloride.html?printable=1, 15 pages.
Vecellio, L. (2006), "The mesh nebuliser: a recent technical innovation for aerosol delivery," Breathe, 2(3):253-260.
Veldhuizen, R. et al. (1998), "The role of lipids in pulmonary surfactant," Biochimica et Biophysica Acta, Vo. 1408, pp. 90-108.
Vidgren, M. et al. (1995), "A study of 99m technetium-labelled beclomethasone dipropionate dilauroylphosphatidylcholine liposome aerosol in normal volunteers," International Journal of Pharmaceutics, vol. 115, pp. 209-216.
Vitas, A. I. et al. (1996), "Effect of composition and method of preparation of liposomes on their stability and interaction with murine monocytes infected with Brucella abortus," Antimicrobial Agents and Chemotherapy, 40(1): 146-151.
Wan, C. et al. (Jun. 2013), "Lipid nanoparticle delivery systems for siRNA-based therapeutics," Drug Deliv. and Transl. Res., 4(1):74-83.
Wang, W. et al. (2000), "Research progress in pulmonary administration of liposome," Journal of Shenyang Pharmaceutical University, 17(3):226-229.
Wang, Z. et al. (2004), "Improved drug delivery: Spray freeze dried nano-liposomal inhaled aerosols," Proceedings of the 2004 International Conference on MEMS, NANO and Smart Systems (ICMENS 2004), Badawy W. et al. (eds.), (University of Calgary), 1 page.
Webb, M. S. et al. (Jan. 1998), "Antibacterial Efficacy against an In Vivo *Salmonella typhimurium* Infection Model and Pharmacokinetics of a Liposomal Ciprofloxacin Formulation," Antimicrobial Agents and Chemotherapy, 42(1):45-52.
Weber, A. et al. (May 1994), "Nebulizer delivery of tobramycin to the lower respiratory tract," Pediatric Pulmonology, 17(5):331-339.
Weber, A. et al. (1997), "Effect of nebulizer type and antibiotic concentration on device performance," Pediatric Pulmonology, vol. 23, pp. 249-260.
Weers, J. et al. (Jun. 2009), "A gamma scintigraphy study to investigate lung deposition and clearance of inhaled amikacin-loaded liposomes in healthy male volunteers," J Aerosol Med Pulm Drug Deliv., 22(2):131-138.
Weiner, A. L. (May-Jun. 1989), "Liposomes as carriers for polypeptides," Advanced Drug Delivery Review, 3(3):307-341.
Westerman, E. M. et al. (2004), "Effect of nebulized colistin sulphate and colistin sulphomethate on lung function in patients with cystic fibrosis: a pilot study," Journal of Cystic Fibrosis, 3(1):23-28.
Whitehead, T. C. et al. (1998), "Kinetics and Toxicity of Liposomal and Conventional Amikacin in a Patient with Multidrug-Resistant Tuberculosis," Eur J Clin Microbiol. Infect. Dis., 17:794-797.
Wichert, B. V. et al. (1992), "Amikacin liposomes: characterization, aerosolization, and in vitro activity against Mycobacterium avium-intracellulare in alveolar macrophages," International Journal of Pharmaceutics, 78(1-3):227-235.
Winthrop, K. L. et al. (May 2015), "Subgroup Analyses of Baseline Demographics and Efficacy in Patients With Refractory Nontuberculous Mycobacteria (NTM) Lung Infection Treated With Liposomal Amikacin for Inhalation (LAI)," Abstract, Diagnosis and Management of Nontuberculous Mycobacteria Infections, Poster Discussion Session, Colorado Convention Center, Am J Respir Crit Care Med 191;2015:A6294, Online Abstracts Issue, 2 pages.
Winthrop, K. L. et al. (May 2015), "Subgroup Analyses of Baseline Demographics and Efficacy in Patients With Refractory Nontuberculous Mycobacteria (NTM) Lung Infection Treated With Liposomal Amikacin for Inhalation (LAI)," Poster presented at the ATS 2015 International Conference, Denver, CO, USA, 1 page.

(56) References Cited

OTHER PUBLICATIONS

Wise et al. (1983), In vitro activity of Bay 09867, a new quinolone derivate compared with those of other antimicrobial agents. Antimicrobial Agents and Chemotherapy 23(4), pp. 559-564.
Wolff, R. K. et al. (1993), "Toxicologic testing of inhaled pharmaceutical aerosols," Critical Reviews in Toxicology, 23(4):343-369.
Wolkers, W. F. et al. (2004), "Preservation of dried liposomes in the presence of sugar and phosphate," Biochimica et Biophysica Acta, 1661:125-134.
Wong et al. (2003), "Liposome delivery of ciprofloxacin against intracellular Francisella tularensis infection," Journal of Controlled Release, 92(3):265-273.
Worlitzsch, D. et al. (2002), "Effects of reduced mucus oxygen concentration in airway pseudomonas infections of cystic fibrosis patients," J. Clin. Invest., 109:317-325.
Worsham, R. D. et al. (2019), "Potential of continuous manufacturing for liposomal drug products," Biotechnology Journal, vol. 14, No. 2, pp. 1-8.
Written Opinion for International Application No. PCT/US2009/060468, mailed Jun. 24, 2010, 3 pages.
Xie, C. (Jun. 2000), Respiratory Diseases, Scientific and Technological Documentation Press, Chapter II Section XI Pseudomonas aerugiosa Pneumonia, pp. 79-81.
Xiu, L. et al. (2002), "Drug Resistant Analysis of Pseudomonas Aeruginosa in Patients with Mechanical Ventilation," Med. J. Chin. PLA, 27(6):544-545, with English Abstract.
Xu, X. et al. (2012), "Chapter 11: Liposomes as Carriers for Controlled Drug Delivery," Wright, J. C et al. (eds.), Long Acting Injections and Implants, Advances in Delivery Science and Technology, pp. 195-222.
Yamazaki, Y. et al. (2006), "The ability to form biofilm influences *Mycobacterium avium* invasion and translocation of bronchial epithelial cells," Cellular Microbiology, 8(5):806-814.
Yanagihara, K. et al. (2002), "Design of anti-bacterial drug and anti-Mycobacterial drug for drug delivery system," Current Pharmaceutical Design, 8:475-482.

Yim, D. et al. (2006), "The Development of Inhaled Liposome-Encapsulated Ciprofloxacin to Treat Cystic Fibrosis," Respiratory Drug Delivery, pp. 425-428.
Yu et al. (1994), "The Effect of Temperature and pH on the Solubility of Quinolone Compounds: Estimation of Heat of Fusion," Pharmaceutical Research, vol. 11, No. 4, pp. 522-527.
Zeituni, A. E. et al. (2010), "Porphyromonas gingivalis-dendritic cell interactions: consequences for coronary artery disease," Journal of Oral Microbiology, 2:5782. doi: 10.3402/jom.v2i0.5782, 8 pages.
Zeng, S. et al. (1993), "Intravitreal Pharmacokinetics of Liposome-encapsulated Amikacin in a Rabbit Model," Ophthamology, vol. 100, pp. 1640-1644.
Zhanel et al. (2002), "A Critical Review of the Fluoroquinolones Focus on Respiratory Tract Infections," Drugs, 62(1):13-59.
Zhang, G. et al. (2007), "Performance of the vibrating membrane aerosol generation device: Aeroneb Micropump nebulizer," Journal of Aerosol Medicine, vol. 20, No. 4, pp. 408-416.
Zhang, J. et al. (May 2018), "Amikacin Liposome Inhalation Suspension (ALIS) Penetrates Non-tuberculous Mycobacterial Biofilms and Enhances Amikacin Uptake Into Macrophages," Frontiers in Microbiology, vol. 9, Article 915, 12 pages.
Zhang, X. et al. (2005), "Antibacterial drug treatment of community acquired pneumonia," Chinese Journal of Respiratory and Critical Care Medicine, 4(4):258-260.
Zhigaltsev, I. V. et al. (2006), "Formation of drug-arylsulfonate complexes inside liposomes: A novel approach to improve drug retention," Journal of Controlled Release, vol. 110, pp. 378-386.
Zhou, L. (Aug. 2002), Guidance for Industry, Liposome Drug Products, Chemistry, Manufacturing, and Controls; Human Pharmacokinetics and Bioavailability; and Labeling Documentation, Draft Guidance, U.S. Department of Health and Human Services, 15 pages.
Zlatanov, Z. et al. (1976), "Gentamycin-pharmachim. Aerosol inhalation treatment of patients with chronic bronchitis," Medico Biologic Information, vol. 2, pp. 5-8.
Patil, Y. P et al., "Novel methods for liposome preparation," Chemistry and Physics of Lipids, vol. 177, Jan. 2014, pp. 8-18.

* cited by examiner

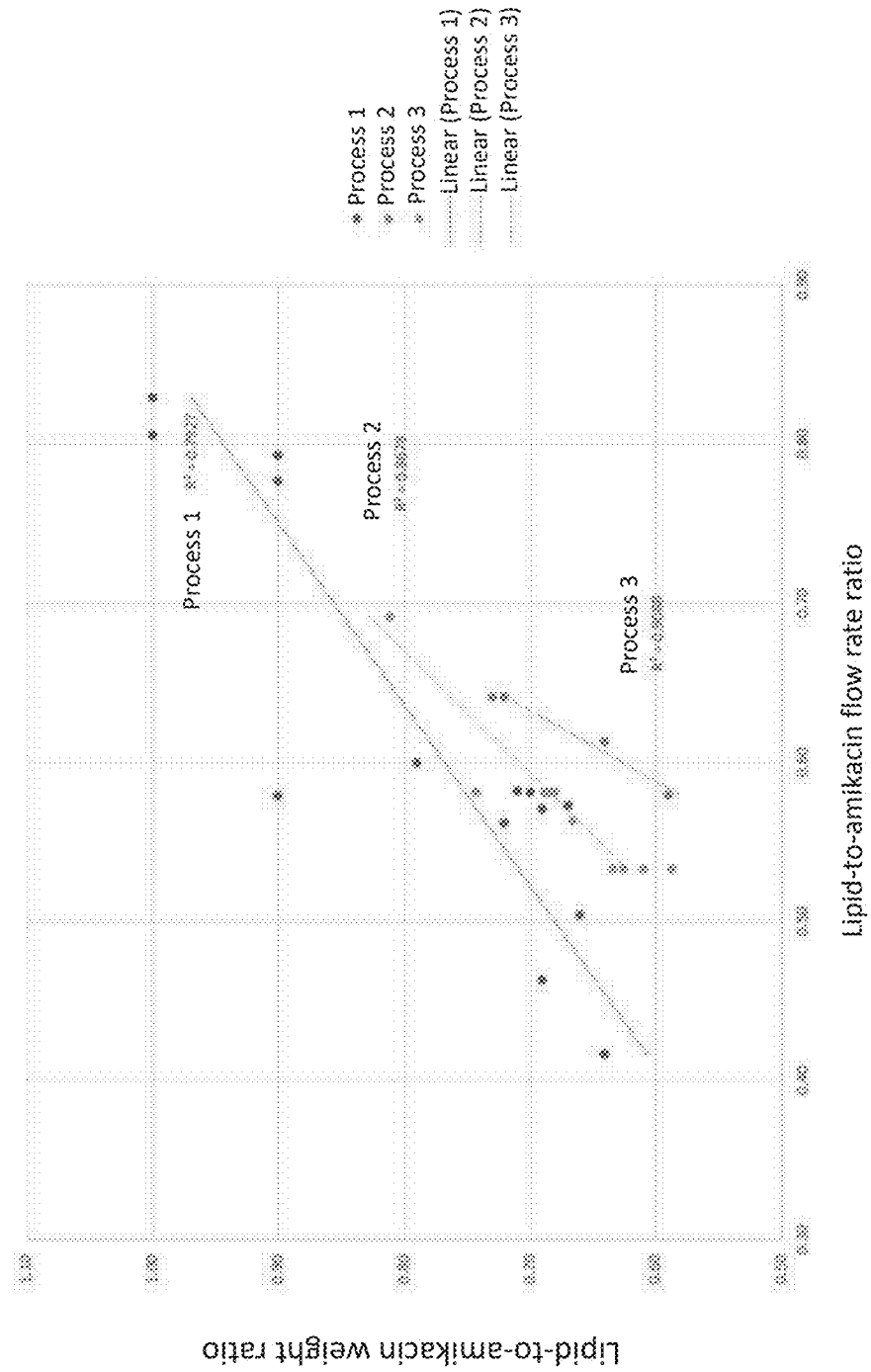

LARGE-SCALE MANUFACTURING METHODS FOR AMINOGLYCOSIDES

CROSS-REFERENCE TO RELATED APPLICATIONS

This application is a continuation of U.S. application Ser. No. 17/052,070, filed Oct. 30, 2020, which is a U.S. National Phase application of PCT/US2019/030404, filed May 2, 2019, which claims priority from U.S. Provisional Application No. 62/665,564, filed May 2, 2018, the disclosures of which are incorporated by reference herein in their entireties for all purposes.

BACKGROUND OF THE INVENTION

Liposomal drug formulations enable the ability to target and enhance the uptake of active agents at specific sites of disease. Such formulations have been developed to treat various pulmonary disorders, including those caused by pulmonary infections, where their characteristics make them an ideal choice for the inhalation delivery of anti-infective agents.

One such anti-infective agent, amikacin, has been packaged in liposomes, and has been studied in multiple clinical trials in adult patients for the treatment of refractory non-tuberculous mycobacterial (NTM) lung disease cause by *Mycobacterium avium* complex (MAC). In a recent Phase 3 study of the amikacin liposome inhalation suspension (ALIS), it was demonstrated that the addition of ALIS to guideline based therapy (GBT) eliminated evidence of NTM lung disease caused by MAC in sputum by month 6 in 29% of patients, compared to 9% of patients on GBT alone.

Although liposomes containing a relatively high amikacin to lipid ratio have been prepared at the bench scale, it is well-known that it is not a routine matter to scale up such processes to produce, at the commercial manufacturing scale, liposomal formulations where parameters such as drug concentration, amount of lipid in the formulation, lipid-to-drug ratio, captured volume, drug leakage, viscosity, and particle size are consistently maintained within specification for clinical and/or commercial use.

The present invention addresses the need for a repeatable large-scale process for preparing liposomes containing an aminoglycoside antibiotic such as amikacin, and having a high aminoglycoside-to-lipid weight ratio (and in turn, a low lipid-to-aminoglycoside weight ratio) and superior encapsulation efficiency.

SUMMARY OF THE INVENTION

In one aspect, the present invention provides a method for the large-scale manufacture of a liposomal aminoglycoside formulation comprising a lipid and an aminoglycoside (e.g., amikacin), with a high aminoglycoside loading relative to the lipid concentration (i.e., a high relative weight ratio of aminoglycoside-to-lipid). In particular, the lipid-to-aminoglycoside (e.g., amikacin) weight ratio (also referred to as the "L/D weight ratio") in the liposomal suspension prepared according to method of the present invention is less than 1:1 upon completion of the process, for example between about 0.5:1 and about 0.9:1. In one embodiment, the lipid-to-aminoglycoside weight ratio of the liposomal suspension prepared according to the method of the present invention is about 0.7:1 (lipid:aminoglycoside) upon completion of the manufacturing process.

In another aspect, the present invention relates to a method for the large-scale manufacture of a liposomal drug formulation comprising a lipid and aminoglycoside (e.g., amikacin), wherein the aminoglycoside is contained within the liposome with a high encapsulation efficiency (e.g., an encapsulation efficiency of at least about 40% prior to washing to remove free aminoglycoside from the formulation).

In one embodiment, the method comprises mixing a first stream comprising a lipid with a second stream comprising an aminoglycoside to form a combined lipid-aminoglycoside stream. The combined lipid-aminoglycoside stream comprises liposomally encapsulated aminoglycoside, which in one embodiment, is formed at the intersection of the lipid stream and the aminoglycoside stream. In a further embodiment, the lipid-aminoglycoside stream is mixed with an aqueous saline solution in a reaction vessel (see, e.g., FIG. 1). In one embodiment, the aminoglycoside is present in an aqueous solution prior to the mixing step. In another embodiment, the lipid is present in an alcoholic solution, e.g., an ethanolic solution, prior to the mixing step. In a further embodiment, the lipid comprises a phospholipid and cholesterol. In one embodiment, the relative flow rate ratio of the second stream comprising aminoglycoside to the first stream comprising a lipid is about 1.5:1 (aminoglycoside stream:lipid stream) to about 2:1 (aminoglycoside stream:lipid stream). In a further embodiment, the lipid comprises dipalmitoylphosphatidylcholine (DPPC) and cholesterol.

In one embodiment, the aqueous saline solution is added to the reaction vessel via a third stream. In a further embodiment, the third stream is added to the reaction vessel at the same time as the combined lipid-aminoglycoside stream. In another embodiment, the third stream is added to the reaction vessel prior to the addition of the combined lipid-aminoglycoside stream to the reaction vessel. In another embodiment, the aqueous saline solution is at about room temperature prior to entering the reaction vessel. In one embodiment, the aqueous saline solution is about 1.5% aqueous sodium chloride.

In one particular aspect, the present invention provides a method for the large-scale manufacture of a liposomal drug formulation comprising a lipid and aminoglycoside (e.g., amikacin), wherein the aminoglycoside is encapsulated within or complexed with the liposome, prior to a washing step, at an encapsulation efficiency of at least 40%. Following the washing step, which in one embodiment, is carried out via tangential flow filtration, the weight ratio of lipid-to-aminoglycoside in the liposomal aminoglycoside formulation is less than 1:1, for example between about 0.5:1 and about 0.9:1 (e.g., about 0.7:1). In one embodiment of this method, the aminoglycoside is amikacin. In a further embodiment, the amikacin is present as amikacin sulfate.

In one embodiment, a first stream comprising a lipid is mixed with a second stream comprising an aminoglycoside to form a combined lipid-aminoglycoside stream (e.g., a lipid-amikacin stream) comprising liposomal aminoglycoside. In one embodiment, the liposomal aminoglycoside formulation is formed at the intersection of the two streams, i.e., upon formation of the combined lipid-aminoglycoside stream. In a further embodiment, the flow rate of the first stream comprising a lipid is from about 0.5 kg/min to about 1.5 kg/min and the flow rate of the second stream comprising aminoglycoside is from about 1 kg/min to about 2 kg/min. In a further embodiment, the flow rate of the first stream comprising a lipid is from about 3 kg/min to about 4 kg/min and the flow rate of the second stream comprising the aminoglycoside is from about 5 kg/min to about 7 kg/min.

In another embodiment, the relative flow rate ratio of the second stream comprising aminoglycoside to the first stream comprising a lipid is about 1.5:1 (aminoglycoside stream flow rate:lipid stream flow rate) to about 2:1 (aminoglycoside stream flow rate:lipid stream flow rate). In yet another embodiment, the lipid comprises dipalmitoylphosphatidylcholine (DPPC) and cholesterol.

In one embodiment, the method for the large-scale manufacture of a liposomal drug formulation comprises mixing a first stream comprising a lipid with a second stream comprising aminoglycoside to form a combined lipid-aminoglycoside stream, and adding the combined lipid-aminoglycoside stream to a vessel comprising an aqueous saline solution. The aqueous saline solution, in one embodiment, is added to the reaction vessel via a third stream (see, e.g., FIG. 1).

In a further embodiment, when the flow rate of the first stream comprising a lipid is from about 0.5 kg/min to about 1.5 kg/min and the flow rate of the second stream comprising aminoglycoside is from about 1 kg/min to about 2 kg/min, the flow rate of the third stream is from about 0.5 L/min and about 2.0 L/min, for example, from about 1.0 L/min to about 2.0 L/min, e.g. from about 1.0 L/min to about 1.5 L/min, including about 1.25 L/min. In another embodiment, when the flow rate of the first stream comprising a lipid is from about 3 kg/min to about 4 kg/min and the flow rate of the second stream comprising aminoglycoside is from about 5 kg/min to about 7 kg/min, the flow rate of the third stream is from about 3 L/min and about 6 L/min, for example, from about 4 L/min to about 6 L/min, e.g. from about 4.5 L/min to about 5.5 L/min, including about 5 L/min.

As used herein, except where specifically stated otherwise, the term "aminoglycoside" is intended to include the aminoglycoside free base and any pharmaceutically acceptable salt thereof. For example, the term "amikacin" is intended to include amikacin free base and any pharmaceutically acceptable salt thereof (e.g., amikacin sulfate).

In one embodiment, the method for the large-scale manufacture of a liposomal aminoglycoside (e.g. amikacin) formulation comprises mixing a first stream comprising a lipid comprising a phospholipid with a second stream comprising aminoglycoside (e.g. amikacin) to form a combined lipid-aminoglycoside stream. In a further embodiment, the lipid-aminoglycoside stream is mixed with an aqueous saline solution in a reaction vessel. In one embodiment, the phospholipid is a phosphatidylcholine. In a further embodiment, the phosphatidylcholine is DPPC. In another embodiment, the lipid comprises a phospholipid and a sterol. In a further embodiment, the sterol is cholesterol. In one embodiment, the lipid comprises DPPC and cholesterol.

In one embodiment, the method for the large-scale manufacture of a liposomal aminoglycoside formulation comprises mixing a first stream comprising a lipid with a second stream comprising aminoglycoside, wherein the first stream is mixed with the second stream to form a combined lipid-aminoglycoside stream. The combined lipid-aminoglycoside stream comprises liposomal aminoglycoside. The liposomal aminoglycoside in one embodiment, is formed upon mixing the first stream and second stream, e.g., at the intersection of the two streams. In a further embodiment, the combined lipid-aminoglycoside stream is added to a reaction vessel and mixed with an aqueous saline solution. In a further embodiment, the aminoglycoside stream and the lipid stream are each maintained at a temperature from about 30° C. to about 50° C. prior to mixing. In a further embodiment, the aminoglycoside and lipid streams are each maintained at a temperature of from about 35° C. to about 45° C., for example from about 38° C. to about 42° C. prior to mixing. In one embodiment, the combined lipid-aminoglycoside stream is cooled upon entering the reaction vessel. In another embodiment, the combined lipid-aminoglycoside stream is cooled by the aqueous saline solution in the reaction vessel. In one embodiment, the reaction vessel is maintained at a temperature from about 25° C. and about 40° C., e.g., from about 27° C. to about 35° C. In another embodiment, the reaction vessel is maintained at a temperature of about 30° C. In another embodiment, the reaction vessel is maintained at a temperature of about 33° C.

In another aspect of the invention, a liposomal aminoglycoside formulation is manufactured on a large-scale according to a method provided herein. In one embodiment, the concentration of aminoglycoside (e.g. amikacin) present in the liposomal drug formulation so prepared is about 10 g/L or greater, for example from about 50 g/L to about 100 g/L, including about 60 g/L to about 80 g/L and about 65 g/L to about 75 g/L (e.g., about 20 g/L, about 30 g/L, 40 about g/L, about 50 g/L, about 60 g/L, about 70 g/L or about 80 g/L). In a further embodiment, the concentration of lipid present in the liposomal drug formulation so prepared is from about 10 g/L to about 100 g/L, including about 20 g/L to about 80 g/L and about 40 g/L to about 60 g/L (e.g. about 50 g/L). In another embodiment, the L/D ratio of a liposomal drug formulation manufactured on a large-scale according to a method provided herein is less than 1:1, for example between about 0.5:1 and about 0.8:1 (e.g. about 0.7:1).

In another embodiment, the liposomal drug formulation manufactured on a large-scale according to a method provided herein comprises liposome particles with a mean particle size (i.e. a mean diameter) of from about 200 nm to about 500 nm, for example from about 200 nm to about 400 nm (e.g. from about 250 nm to about 350 nm).

BRIEF DESCRIPTION OF THE FIGURES

FIG. 2 shows the effect of relative lipid/amikacin flow rates on the resulting L/D ratio of various liposomal amikacin formulations.

DETAILED DESCRIPTION OF THE INVENTION

Figure 1:
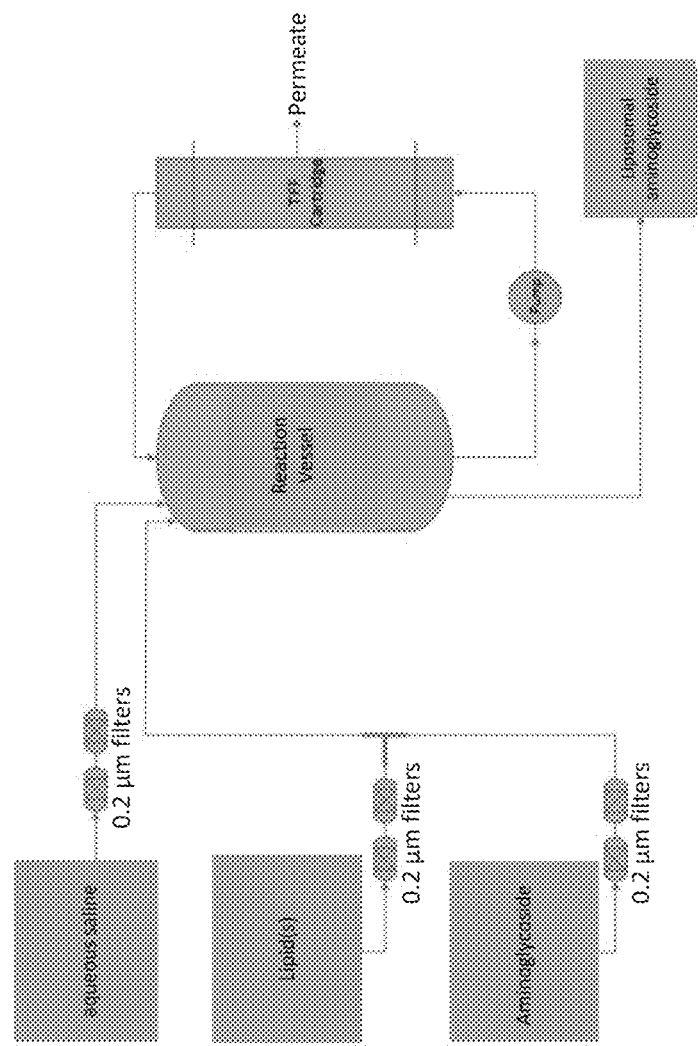
FIG. 1 depicting one embodiment of the invention for preparing a liposomal aminoglycoside formulation.

In one aspect, the invention described herein relates to a method for manufacturing a liposomal aminoglycoside formulation on a large-scale. In one embodiment, the method comprises mixing a first stream comprising a lipid (also referred to herein as a "lipid stream") with a second stream comprising an aminoglycoside such as amikacin (also referred to herein as a "drug stream") to form a combined lipid-aminoglycoside stream, and the lipid-aminoglycoside stream is mixed with an aqueous saline solution in a reaction vessel. In some embodiments, the aqueous saline solution enters the reaction vessel via a third stream.

The mixing of the lipid and drug streams is effected such that a turbulent flow results when forming the combined lipid-aminoglycoside stream. A turbulent flow is conveniently achieved using an appropriate T-shaped or Y-shaped infusion module for "in-line" mixing of the lipid and drug streams.

The term "large-scale" means the use of at least about 5 kg aminoglycoside base starting material in the drug stream (calculated to at least about 5 kg aminoglycoside base if a pharmaceutically acceptable salt is used). In one embodiment, about 5 kg to about 50 kg aminoglycoside base starting material is used, for example about 5 kg to about 35 kg aminoglycoside base starting material. In one embodiment, at least about 8 kg aminoglycoside base starting material is used. In another embodiment, at least about 30 kg aminoglycoside base starting material is used. In one embodiment, the aminoglycoside is amikacin (e.g. amikacin sulfate).

The aminoglycoside used in the methods provided herein can be present as a pharmaceutically acceptable salt or as the free base. As provided above, in one embodiment, the aminoglycoside is amikacin, e.g., amikacin sulfate.

In another embodiment, the aminoglycoside is amikacin, apramycin, arbekacin, astromicin, capreomycin, dibekacin, framycetin, gentamicin, hygromycin B, isepamicin, kanamycin, neomycin, netilmicin, paromomycin, rhodestreptomycin, ribostamycin, sisomicin, spectinomycin, streptomycin, tobramycin, verdamicin, or a combination thereof.

In yet another embodiment, the aminoglycoside is AC4437, amikacin, apramycin, arbekacin, astromicin, bekanamycin, boholmycin, brulamycin, capreomycin, dibekacin, dactimicin, etimicin, framycetin, gentamicin, H107, hygromycin, hygromycin B, inosamycin, K-4619, isepamicin, KA-5685, kanamycin, neomycin, netilmicin, paromomycm, plazomicin, ribostamycin, sisomicm, rhodestreptomycin, sorbistin, spectinomycin, sporaricin, streptomycin, tobramycin, verdamicin, vertilmicin, or a combination thereof.

A "pharmaceutically acceptable salt" includes both acid and base addition salts. A pharmaceutically acceptable addition salt refers to those salts which retain the biological effectiveness and properties of the free bases, which are not biologically or otherwise undesirable, and which are formed with inorganic acids such as, but are not limited to, hydrochloric acid (HCl), hydrobromic acid, sulfuric acid, nitric acid, phosphoric acid and the like, and organic acids such as, but not limited to, acetic acid, 2,2-dichloroacetic acid, adipic acid, alginic acid, ascorbic acid, aspartic acid, benzenesulfonic acid, benzoic acid, 4-acetamidobenzoic acid, camphoric acid, camphor-10-sulfonic acid, capric acid, caproic acid, caprylic acid, carbonic acid, cinnamic acid, citric acid, cyclamic acid, dodecylsulfuric acid, ethane-1,2-disulfonic acid, ethanesulfonic acid, 2-hydroxyethanesulfonic acid, formic acid, fumaric acid, galactaric acid, gentisic acid, glucoheptonic acid, gluconic acid, glucuronic acid, glutamic acid, glutaric acid, 2-oxo-glutaric acid, glycerophosphoric acid, glycolic acid, hippuric acid, isobutyric acid, lactic acid (e.g., as lactate), lactobionic acid, lauric acid, maleic acid, malic acid, malonic acid, mandelic acid, methanesulfonic acid, mucic acid, naphthalene-1,5-disulfonic acid, naphthalene-2-sulfonic acid, 1-hydroxy-2-naphthoic acid, nicotinic acid, oleic acid, orotic acid, oxalic acid, palmitic acid, pamoic acid, propionic acid, pyroglutamic acid, pyruvic acid, salicylic acid, 4-aminosalicylic acid, sebacic acid, stearic acid, succinic acid, acetic acid (e.g., as acetate), tartaric acid, thiocyanic acid, p-toluenesulfonic acid, trifluoroacetic acid (TFA), undecylenic acid, and the like. In one embodiment, the pharmaceutically acceptable salt is HCl, TFA, lactate or acetate. In one embodiment, the pharmaceutically acceptable salt is a sulfate salt, e.g., amikacin sulfate.

"Liposomal aminoglycoside formulation" refers to a lipid-aminoglycoside formulation wherein the lipid is in the form of a liposome and the aminoglycoside is encapsulated by the liposome bilayer, or complexed with the liposome bilayer. Liposomes are completely closed lipid bilayer membranes containing an entrapped aqueous volume. Liposomes may be unilamellar vesicles (possessing a single membrane bilayer) or multilamellar vesicles (onion-like structures characterized by multiple membrane bilayers, each separated from the next by an aqueous layer) or a combination thereof. The bilayer is composed of two lipid monolayers having a hydrophobic "tail" region and a hydrophilic "head" region. The structure of the membrane bilayer is such that the hydrophobic (nonpolar) "tails" of the lipid monolayers orient toward the center of the bilayer while the hydrophilic "heads" orient towards the aqueous phase.

In one embodiment, the lipid-aminoglycoside formulation is manufactured via a method comprising a two-stream infusion process. In one embodiment, the method comprises mixing a first lipid stream with a second aminoglycoside stream in a T-shaped infusion module or Y-shaped infusion module. The terms "T-shaped infusion module," and "Y-shaped infusion module" as used herein, refer to a T-shaped or Y-shaped chamber in which two or more streams are combined, for example, in which a lipid stream and a drug stream are combined to form a single lipid-aminoglycoside stream. See, e.g., the diagram at FIG. 1. It will be appreciated that the infusion module will have a bore size appropriate for the required rate of the lipid and drug streams used. Examples of suitable bore sizes include, but are not limited to, ³⁄₁₆" and ⅜".

In one embodiment, the first stream (lipid stream) comprises an alcoholic (e.g., ethanolic) lipid solution. In one embodiment, the second stream (aminoglycoside stream) comprises an aqueous aminoglycoside solution (e.g., aqueous amikacin solution). In one embodiment, the first and second streams are mixed to form a combined lipid-aminoglycoside stream. In one embodiment, the first and second streams each enter the infusion module and the first and second streams are mixed in the infusion module. In a further embodiment, the combined lipid-aminoglycoside stream exits the infusion module and subsequently enters the reaction vessel. See FIG. 1.

In one embodiment, the combined lipid-aminoglycoside stream is mixed with an aqueous saline solution in a reaction vessel, e.g., the same reaction vessel that the combined lipid-aminoglycoside stream enters after exiting the infusion module. In one embodiment, the aqueous saline solution comprises about 0.5-2% aqueous sodium chloride solution (e.g., about 1.5%). In one embodiment, the saline solution is added to the reaction vessel prior to the combined lipid-aminoglycoside stream. In another embodiment, the saline solution is added to the reaction vessel at or about the same time as the combined lipid-aminoglycoside stream. In a further embodiment, the saline solution is added to the reaction vessel via a third stream. Thus, in some embodiments, the lipid-aminoglycoside formulation is manufactured via a method comprising a 3-stream infusion process. In some embodiments, the third stream is added to the reaction vessel separately from the combined lipid-aminoglycoside stream.

In one embodiment, the combined lipid-aminoglycoside stream comprises liposomal aminoglycoside, (e.g. amikacin), wherein the encapsulation efficiency of the aminoglycoside within the liposomes (or complexed to the liposomes) is at least about 40%. "Encapsulation efficiency", as used herein, refers to the amount of aminoglycoside encapsulated or complexed with liposomes prior to a filtration step, e.g., tangential flow filtration of the liposomal aminoglycoside formulation to remove free aminoglycoside. For example, an encapsulation efficiency of between about 40% and about 70% (e.g., from about 45% to about 55%) can be achieved by mixing the lipid and aminoglycoside (e.g. amikacin) streams according to the method of this invention as herein described.

In one embodiment, the aminoglycoside stream and the lipid stream are each maintained at a temperature from about 30° C. to about 50° C. prior to mixing the two streams. In a further embodiment, the aminoglycoside and lipid streams are each maintained at a temperature of from about 35° C. to about 45° C., for example from about 38° C. to about 42° C. prior to mixing. In another embodiment, the combination of the lipid and aminoglycoside solutions exhibits exothermal behavior. The temperature of the combined lipid-aminoglycoside stream, in one embodiment, is from about 40° C. to 55° C. In a further embodiment, the temperature of the combined lipid-aminoglycoside stream is from about 45° C. to about 50° C. In another embodiment, the combined lipid-aminoglycoside stream is mixed with an aqueous saline solution in a reaction vessel, wherein the aqueous saline solution is maintained at room temperature prior to mixing with the combined lipid-aminoglycoside stream. In another embodiment, an aqueous saline solution is added to the reaction vessel via a third stream, wherein the third stream is maintained at room temperature prior to mixing with the combined lipid-aminoglycoside stream. In one embodiment, the combined lipid-aminoglycoside stream is cooled upon entering the reaction vessel. In another embodiment, the combined lipid-aminoglycoside stream is cooled by the aqueous saline solution in the reaction vessel. In another embodiment, the combined lipid-aminoglycoside stream is cooled upon entering the reaction vessel. In one embodiment, the reaction vessel is maintained at a temperature from about 25° C. and about 40° C., e.g., from about 27° C. to about 35° C. In another embodiment, the reaction vessel is maintained at a temperature of about 30° C. In another embodiment, the reaction vessel is maintained at a temperature of about 33° C.

In one embodiment, the lipid component of the liposomal drug formulation manufactured by the method provided herein comprises electrically net neutral lipids, positively charged lipids, negatively charged lipids, or a combination thereof. In another embodiment, the lipid component comprises electrically net neutral lipids. In a further embodiment, the lipid component consists essentially of electrically net neutral lipids. In even a further embodiment, the lipid is DPPC and cholesterol.

The lipids used in the manufacture of the liposomal formulations of the present invention can be synthetic, semi-synthetic or naturally-occurring lipids, including one or more of phospholipids, tocopherols, sterols, fatty acids, negatively-charged lipids and cationic lipids. In one embodiment, the lipid component consists of electrically neutral lipids, e.g., a sterol and a phospholipid.

In one embodiment, at least one phospholipid is present in the liposomal drug formulation. In one embodiment, the phospholipid is phosphatidylcholine (PC), phosphatidylglycerol (PG), phosphatidylinositol (PI), phosphatidylserine (PS), phosphatidylethanolamine (PE), phosphatidic acid (PA), soy phosphatidylcholine (SPC), soy phosphatidylglycerol (SPG), soy phosphatidylserine (SPS), soy phosphatidylinositol (SPI), soy phosphatidylethanolamine (SPE), and soy phosphatidic acid (SPA); hydrogenated egg and soya counterparts (e.g., hydrogenated egg phosphatidylcholine and hydrogenated soy phosphatidylcholine), phospholipids made up of ester linkages of fatty acids in the 2 and 3 of glycerol positions containing chains of 12 to 26 carbon atoms and different head groups in the 1 position of glycerol that include choline, glycerol, inositol, serine, ethanolamine, as well as the corresponding phosphatidic acids. The carbon chains on these fatty acids can be saturated or unsaturated, and the phospholipid may be made up of fatty acids of different chain lengths and different degrees of unsaturation.

In one embodiment, the lipid component of the liposomal drug formulation manufactured by the method provided herein comprises a phosphatidylcholine. For example, in one embodiment, the lipid component in the liposomal drug formulation comprises dipalmitoylphosphatidylcholine (DPPC). In one embodiment, the lipid component of the liposomal drug formulation comprises DPPC and a sterol, for example DPPC and cholesterol. Alternatively, the lipid consists essentially of DPPC and cholesterol, or consists of DPPC and cholesterol. In a further embodiment, the DPPC and cholesterol have a molar ratio in the range of from about 19:1 (DPPC:cholesterol) to about 1:1 (DPPC:cholesterol), or from about 9:1 (DPPC:cholesterol) to about 1:1 (DPPC:cholesterol), or from about 4:1 (DPPC:cholesterol) to about 1:1 (DPPC:cholesterol), or from about 2:1 (DPPC:cholesterol) to about 1:1 (DPPC:cholesterol). In even a further embodiment, the DPPC and cholesterol have a molar ratio of about 2:1 (DPPC:cholesterol).

Other examples of lipid components of the liposomal drug formulation manufactured by the method provided herein include, but are not limited to, dimyristoylphosphatidycholine (DMPC), dimyristoylphosphatidylglycerol (DMPG), dipalmitoylphosphatidcholine (DPPC), dipalmitoylphosphatidylglycerol (DPPG), distearoylphosphatidylcholine (DSPC), distearoylphosphatidylglycerol (DSPG), dioleylphosphatidyl-ethanolamine (DOPE), mixed phospholipids such as palmitoylstearoylphosphatidyl-choline (PSPC), and single acylated phospholipids, for example, mono-oleoylphosphatidylethanolamine (MOPE).

Examples of sterol compounds in the liposomal drug formulation manufactured by the method provided herein include, but are not limited to, cholesterol, esters of cholesterol including cholesterol hemi-succinate, salts of cholesterol including cholesterol hydrogen sulfate and cholesterol sulfate, ergosterol, esters of ergosterol including ergosterol hemi-succinate, salts of ergosterol including ergosterol hydrogen sulfate and ergosterol sulfate, lanosterol, esters of lanosterol including lanosterol hemi-succinate, salts of lanosterol including lanosterol hydrogen sulfate, lanosterol sulfate and tocopherols. The tocopherols include tocopherols, esters of tocopherols including tocopherol hemi-succinates, salts of tocopherols including tocopherol hydrogen sulfates and tocopherol sulfates. The term "sterol compound" includes sterols, tocopherols and the like. Tocopherols and their water-soluble derivatives have been used to form liposomes, see, e.g., PCT Publication No. 87/02219.

In one embodiment, the concentration of lipid in the first stream is from about 10 g/L to about 50 g/L, or from about 10 g/L to about 30 g/L, or from about 15 g/L to about 25 g/L. In one embodiment, the concentration of lipid in the first stream is about 17 g/L, about 18 g/L, about 19 g/L, about 20 g/L, about 21 g/L, about 22 g/L, about 23 g/L, about 24 g/L or about 25 g/L. In one embodiment, the concentration of lipid in the first stream is about 20 g/L In one embodiment, the concentration of aminoglycoside in the second stream (aminoglycoside stream) is from about 10 g/L to about 100 g/L; or from about 20 g/L to about 70 g/L; or from about 30 g/L to about 60 g/L; or from about 40 g/L to about 50 g/L. In one embodiment, the concentration of drug in the second stream is about 41 g/L, about 42 g/L, about 43 g/L, about 44 g/L, about 45 g/L, about 46 g/L, about 47 g/L, about 48 g/L, about 49 g/L or about 50 g/L. In one embodiment, the concentration of aminoglycoside in the second stream is about 45 g/L. In a further embodiment, the aminoglycoside is amikacin.

In one embodiment of the invention, the pH of the aminoglycoside stream is from 6 to about 7, or from about 6.5 to about 7.0. In a further embodiment, the pH of the aminoglycoside stream is about 6.7. The aminoglycoside stream pH may be adjusted to the appropriate pH using a suitable base, such as an alkali or alkaline earth metal hydroxide, e.g. sodium hydroxide.

In another embodiment, the aqueous saline solution comprises about 0.5% sodium chloride to about 3% sodium chloride, for example about 0.75%, about 1.0%, about 1.25%, about 1.5%, about 1.75%, about 2.0%, or about 2.5% sodium chloride. In one embodiment, the aqueous saline solution comprises about 1.5% sodium chloride.

In one embodiment, the flow rate of the lipid stream is from about 0.5 kg/min to about 1.5 kg/min and the flow rate of the aminoglycoside stream is from about 1 kg/min to about 2 kg/min. In a further embodiment, the flow rate of the lipid stream is from about 3 kg/min to about 4 kg/min and the flow rate of the drug stream is from about 5 kg/min to about 7 kg/min. In another embodiment, the relative flow rate ratio of the aminoglycoside stream to the lipid stream is about 1.5:1 (aminoglycoside stream flow rate:lipid stream flow rate) to about 2:1 (aminoglycoside stream flow rate: lipid stream flow rate).

In one embodiment, when the flow rate of the lipid stream is from about 0.5 kg/min to about 1.5 kg/min and the flow rate of the aminoglycoside stream is from about 1 kg/min to about 2 kg/min, the flow rate of the third stream comprising aqueous saline solution is from about 0.5 L/min and about 2.0 L/min, for example, from about 1.0 L/min to about 2.0 L/min, e.g., from about 1.0 L/min to about 1.5 L/min, including about 1.25 L/min. In another embodiment, when the flow rate of the lipid stream is from about 3 kg/min to about 4 kg/min and the flow rate of the aminoglycoside stream is from about 5 kg/min to about 7 kg/min, the flow rate of the third stream comprising the aqueous saline solution is from about 3 L/min and about 6 L/min, for example, from about 4 L/min to about 6 L/min, e.g. from about 4.5 L/min to about 5.5 L/min, including about 5 L/min.

In one embodiment of the invention, the lipid and aminoglycoside (e.g., amikacin) solutions are both filtered, for example through one or more (e.g., two in series) about 0.2 µm filters, prior to mixing into a combined stream (FIG. 1). Although FIG. 1 shows two filters in series, it should be noted that this number can be changed according to the preference of the user of the method. For example, one to five filters can be used to initially filter the lipid stream and the aminoglycoside stream.

In another embodiment, the aqueous saline solution (e.g., 1.5% saline solution) is also filtered, for example through one or more (e.g., two in series) about 0.2 µm filters, prior to mixing with the lipid-aminoglycoside combined stream in the reaction vessel. In a further embodiment, the liposomal suspension, comprising liposomes formed at the intersection of the lipid and aminoglycoside streams, and/or in the combined lipid-aminoglycoside stream, is concentrated within the reaction vessel using a recirculating filtration system such as diafiltration. As provided above, "encapsulation efficiency", as used herein, refers to the amount of aminoglycoside encapsulated or complexed with liposomes prior to a filtration step, e.g., tangential flow filtration of the liposomal aminoglycoside formulation to remove free aminoglycoside. For example, an encapsulation efficiency of between about 40% and about 70% (e.g., from about 45% to about 55%) can be achieved by mixing the lipid and aminoglycoside (e.g. amikacin) streams according to the method of this invention as herein described.

In another embodiment, the resulting concentrated liposomal suspension is treated (i.e., "washed") with additional aqueous saline solution (e.g., filtered 1.5% saline solution) and subjected to further filtration using a recirculating filtration system such as diafiltration until the liposomal suspension contains an appropriate final aminoglycoside concentration and substantially all of the free aminoglycoside is removed. In a further embodiment, three or more washes (e.g., 3, 4, 5 or 6 washes) are conducted to achieve the appropriate final aminoglycoside concentration.

In one embodiment, following washing, the concentration of aminoglycoside present in the liposomal aminoglycoside formulation manufactured on a large-scale according to a method provided herein is about 10 g/L or greater. In a further embodiment, aminoglycoside is present in the formulation at a concentration of about 20 g/L or greater. In a further embodiment, aminoglycoside is present in the formulation at a concentration of about 30 g/L or greater. In a further embodiment, aminoglycoside is present in the formulation at a concentration of about 40 g/L or greater. In a further embodiment, aminoglycoside is present in the formulation at a concentration of about 50 g/L or greater. In a further embodiment, aminoglycoside is present in the formulation at a concentration of about 60 g/L or greater. In a further embodiment, aminoglycoside is present in the formulation at a concentration of about 70 g/L or greater. In another embodiment, the aminoglycoside is present in the formulation at a concentration of from about 10 g/L to about 100 g/L. In a further embodiment, the aminoglycoside is amikacin. In one embodiment, the aminoglycoside is present in the formulation at a concentration of from about 50 g/L to about 100 g/L. In a further embodiment, the aminoglycoside is amikacin. In one embodiment, the aminoglycoside is present in the formulation at a concentration of from about 60 g/L to about 80 g/L. In a further embodiment, the aminoglycoside is amikacin. In yet another embodiment, the aminoglycoside is present in the formulation at a concentration from about 65 g/L to about 80 g/L. In a further embodiment, the aminoglycoside is amikacin. In yet another embodiment, the aminoglycoside is present in the formulation at a concentration from about 65 g/L to about 75 g/L. In a further embodiment, the aminoglycoside is amikacin. In another embodiment, amikacin is present in the formulation at a concentration of about 70 g/L. In a further embodiment, the aminoglycoside is amikacin.

In a further embodiment, following washing, the concentration of lipid present in the liposomal drug formulation manufactured on a large-scale according to a method provided herein is from about 10 g/L to about 100 g/L, including about 20 g/L to about 80 g/L and about 40 g/L to about 60 g/L (e.g., about 50 g/L).

In another embodiment, following diafiltration, the lipid-to-aminoglycoside weight ratio in a liposomal drug formulation manufactured on a large-scale according to a method provided herein is less than 1:1, for example between about 0.5:1 (lipid:aminoglycoside) and about 0.8:1 (lipid:aminoglycoside) (e.g., about 0.5:1 (lipid:aminoglycoside) or 0.6:1 (lipid:aminoglycoside) or 0.7:1 (lipid:aminoglycoside) or 0.8:1 (lipid:aminoglycoside)). In one embodiment, the lipid-to-aminoglycoside weight ratio is about 0.7:1 (lipid:aminoglycoside).

The liposomal aminoglycoside formulation manufactured on a large-scale according to a method provided herein comprises liposome particles with a mean particle size (i.e. a mean diameter) of from about 200 nm to about 500 nm, for example from about 200 nm to about 400 nm (e.g. from about 250 nm to about 350 nm). The liposome diameter may be measured using commercially available light scattering technology, for example by quasi-elastic light scattering using a Nicomp™ 380 submicron particle sizer (Nicomp, Santa Barbara, California USA).

The present invention is further illustrated by reference to the following Examples. However, it should be noted that these Examples, like the embodiments and aspects described above, are illustrative and are not to be construed as limiting the scope of the invention in any way.

EXAMPLES

Example 1: Manufacturing Process and Process Controls for Liposomal Amikacin

The manufacture of liposomal amikacin sulfate was conducted using an aseptic process that involves the preparation of three sterile solution streams, mixing the lipid and amikacin sulfate streams at appropriate flow rates via a T-connector infusion module, collecting the combined lipid-amikacin sulfate streams containing liposomes with encapsulated amikacin sulfate in a sterilized diafiltration (reaction) vessel, adding a stream of 1.5% aqueous sodium chloride at an appropriate flow rate to the diafiltration vessel, followed by diafiltration (including washing) and concentration of the resulting liposomal dispersion to form the final product.

a) Solution Preparation: Sufficient quantities of the following three solutions were prepared.
  Amikacin sulfate solution: Amikacin sulfate in water for injection (WFI), pH adjusted with sodium hydroxide to 6.6-6.8.
  Lipid solution: DPPC/cholesterol (2:1 w/w) in ethanol.
  1.5% Sodium chloride solution: 1.5% Sodium chloride in WFI, pH adjusted to 6.6-6.8.
The solutions must be used within 24 hours of preparation.

b) Infusion/Initial Concentration: The amikacin sulfate solution and lipid solution were warmed and passed through separate sterilizing filters before flowing through an in-line T-connector infusion module at controlled rates of addition. The mixed streams were collected in a pre-sterilized reactor vessel. Simultaneously, 1.5% aqueous sodium chloride solution was passed through a sterilizing filter and introduced as a stream at an appropriate flow rate into the reactor vessel. At this stage, the solution may be sampled for the level of amikacin encapsulation.

c) Diafiltration: Diafiltration was conducted. This step functions to remove the ethanol from the bulk solution and to wash away any "unentrapped" or free amikacin sulfate.

d) Final Concentration: Using an in-process test result, the bulk solution was concentrated to an appropriate concentration level of amikacin sulfate. After concentration is complete, confirmatory tests for concentration of amikacin sulfate and L/D ratio may be performed.

Table 1 describes experiments (A) and (B), performed according to the general method of Example 1. In (A), a ⅜" T-connector infusion module is used. In (B), a ³⁄₁₆" T-connector infusion module is used.

TABLE 1

| Ex. | Amikacin calculated free base weight (kg) | DPPC weight (kg) | Cholesterol weight (kg) | Amikacin sulfate solution concentration (g/L) | Amikacin sulfate solution flow rate (kg/min) | Lipid solution concentration (g/L) | Lipid solution flow rate (kg/min) | L/D ratio obtained | Amikacin sulfate concentration obtained (mg/mL) |
|---|---|---|---|---|---|---|---|---|---|
| (A) | 30.428 | 7.33 ± 0.050 | 3.67 ± 0.050 | 45 | 5.64 | 20 | 3.62 | 0.72 | 70 ± 3 |
| (B) | 8.250 | 1.666 ± 0.001 | 0.834 ± 0.001 | 45 | 1.464 | 20 | 0.851 | 0.68 to 0.74 | 70 ± 3 |

In additional experiments, generally following the process of Example 1, the lipid and amikacin stream (flow) rates were varied, and the resulting concentrations of lipid and amikacin in the liposomal formulations were measured. The L/D ratio for each experiment was calculated and the results presented in FIG. 2. The results provide guidance for an optimal relative lipid/amikacin flow rate to achieve a preferred L/D ratio.

All, documents, patents, patent applications, publications, product descriptions, and protocols which are cited throughout this application are incorporated herein by reference in their entireties for all purposes.

The embodiments illustrated and discussed in this specification are intended only to teach those skilled in the art the best way known to the inventors to make and use the invention. Modifications and variation of the above-described embodiments of the invention are possible without departing from the invention, as appreciated by those skilled in the art in light of the above teachings. It is therefore understood that, within the scope of the claims and their equivalents, the invention may be practiced otherwise than as specifically described.

The invention claimed is:

1. A large-scale method of preparing a liposomal amikacin sulfate formulation, wherein the liposomal amikacin sulfate formulation comprises amikacin sulfate encapsulated in a lipid, and liposomes in the liposomal amikacin sulfate formulation have a mean diameter of about 200 nm to about 400 nm, the method comprising:

(a) mixing a first stream comprising an alcoholic solution of the lipid, wherein the lipid consists of dipalmitoyl phosphatidylcholine (DPPC) and cholesterol, with a second stream consisting of an aqueous solution of amikacin sulfate to form a combined lipid-amikacin sulfate stream, wherein the concentration of the lipid in the first stream is from about 10 g/L to about 30 g/L, the concentration of amikacin sulfate in the second stream is from 40 g/L to 45 g/L, and an amount of amikacin sulfate in the second stream is equivalent to about 5 kg to about 50 kg of amikacin, (b) mixing the lipid-amikacin sulfate stream of Step (a) with an aqueous saline solution in a reaction vessel, wherein the aqueous saline solution consists of water and sodium chloride, and (c) washing the product of Step (b) comprising the liposomal amikacin sulfate formulation to remove unencapsulated amikacin sulfate and to provide a washed liposomal amikacin sulfate formulation having an overall ratio of the weight of the lipid to the equivalent weight of amikacin of between about 0.5 (lipid):1 (amikacin) and about 0.8 (lipid):1 (amikacin), wherein the relative flow rate ratio of the second stream to the first stream is about 1.5:1 to about 2:1.

2. The method of claim 1, wherein the aqueous saline solution is added to the reaction vessel via a third stream.

3. The method of claim 1, wherein the flow rate of the first stream is from about 0.5 kg/min to about 1.5 kg/min, and the flow rate of the second stream is from about 1 kg/min to about 2 kg/min.

4. The method of claim 1, wherein the flow rate of the first stream is from about 3 kg/min to about 4 kg/min, and the flow rate of the second stream is from about 5 kg/min to about 7 kg/min.

5. The method of claim 1, wherein the aqueous saline solution consists of about 0.5-2% aqueous sodium chloride solution.

6. The method of claim 1, wherein the second stream comprising amikacin sulfate and the first stream comprising the lipid are each maintained at a temperature from about 30° C. to about 50° C. prior to mixing.

7. The method of claim 1, wherein following Step (b) the liposomes are prepared with an amikacin sulfate encapsulation efficiency of at least 40%.

8. The method of claim 1, wherein the washing Step (c) is performed using 1.5% aqueous sodium chloride solution.

9. The method of claim 8, wherein the washing Step (c) is repeated, and the product concentrated to provide the liposomal amikacin sulfate formulation with amikacin sulfate present at a concentration of from about 60 g/L to about 80 g/L.

10. The method of claim 1, wherein the concentration of the lipid in the first stream is about 20 g/L.

11. The method of claim 1, wherein the concentration of amikacin sulfate in the second stream is 45 g/L.

12. The method of claim 1, wherein the washed liposomal amikacin sulfate formulation has an overall ratio of the weight of the lipid to the equivalent weight of amikacin of between about 0.5 (lipid):1 (amikacin) and about 0.6 (lipid):1 (amikacin).

13. The method of claim 1, wherein the washed liposomal amikacin sulfate formulation has an overall ratio of the weight of the lipid to the equivalent weight of amikacin of about 0.7 (lipid):1 (amikacin).

14. The method of claim 2, wherein the third stream is added to the reaction vessel at the same time as the lipid-amikacin sulfate stream.

15. The method of claim 5, wherein the aqueous saline solution consists of about 1.5% aqueous sodium chloride solution.

16. The method of claim 9, wherein amikacin sulfate is present at a concentration of about 70 g/L in the liposomal amikacin sulfate formulation.

17. The method of claim 9, wherein the lipid is present at a concentration from about 40 g/L to about 60 g/L in the liposomal amikacin sulfate formulation.

* * * * *